United States Patent [19]

Chimenti

[11] Patent Number: 5,106,468
[45] Date of Patent: Apr. 21, 1992

[54] ELECTROPHORETIC SEPARATION

[75] Inventor: Robert J. L. Chimenti, Short Hills, N.J.

[73] Assignee: Exxon Research and Engineering Company

[21] Appl. No.: 814,381

[22] Filed: Dec. 30, 1985

[51] Int. Cl.$^5$ .................. B01D 57/02; B01D 17/06; G01N 27/26; B03C 5/02
[52] U.S. Cl. ................. 204/180.1; 204/181.8; 204/299 R; 204/300 R; 204/302; 204/DIG. 8; 204/DIG. 9
[58] Field of Search ........ 204/180.1, DIG. 9, DIG. 8, 204/181.8, 181.9, 191, 188, 189, 190, 299 R, 180.2, 180.5, 183.1, 182.3, 302, 300 R

[56] References Cited

U.S. PATENT DOCUMENTS

| | | | |
|---|---|---|---|
| 1,570,209 | 1/1926 | DeBrey | 204/191 |
| 2,300,283 | 10/1942 | Fisher | 204/181.8 |
| 2,376,535 | 5/1945 | Fisher | 204/181.8 |
| 2,555,487 | 6/1951 | Haugaard et al. | 204/299 R |
| 3,928,158 | 12/1975 | Fritsche et al. | 204/188 |

OTHER PUBLICATIONS

Coler, Myron A. "Electrophoretic Deposition" Kirk-Othmer Encyclopedia of Chemical Technology, vol. 8 (1965) p. 27.
Mysels, Karol V. "Introduction to Colloid Chemistry" Interscience Publishers, Inc., New York, pp. 7-8.
Stotz, Siegfried, "Field Dependence of the Electrophoretic Mobility of Particles Suspended in Low-Conductivity Liquids" Journal of Colloid and Interface Science, vol. 65, No. 1, Jun. 1978.

Primary Examiner—John Niebling
Assistant Examiner—John S. Starsiak, Jr.

[57] ABSTRACT

For the electrophoretic separation of a dispersed phase or contaminant (solid, liquid, or gaseous) from a continuous liquid phase under conditions of intrinsic ionic conductivity due to intrinsic bipolar ions in the continuous phase, especially for conductivities of the continuous liquid phase in excess of about $10^{-8}$ $(\Omega.m)^{-1}$ for which known electrofiltration processes are relatively ineffective or unworkable, a voltage is applied to the dispersed phase-containing liquid phase. The dispersed phase has a field-dependent mobility, and the applied voltage is such as to establish, within the liquid to be treated, a periodic asymmetric electric field E(t), conveniently comprising alternate positive and negative rectangular pulses, having the properties that the time-averaged amplitude of E(t) over one complete period, T, is zero but the average amplitude of each positive feature of the periodic waveform is unequal to that of each negative feature. These conditions give rise to a net electrophoretic migration of dispersed phase which causes dispersed phase to accumulate in a collection region, for example on one or more collector surfaces or within the liquid bulk. In the former case, the collector surfaces are periodically cleaned or regenerated (for deposited solids) or, for liquid or gaseous contaminants, the dispersed phase separates by settling or floatation from the collector surfaces. In the latter case the collected dispersed phase can be mechanically filtered off (with a solid dispersed phase) or allowed to settle or float (for solid, liquid or gaseous dispersed phases). The process is of particular practical importance for the electrofiltration of contaminated petroleum liquids.

16 Claims, 7 Drawing Sheets

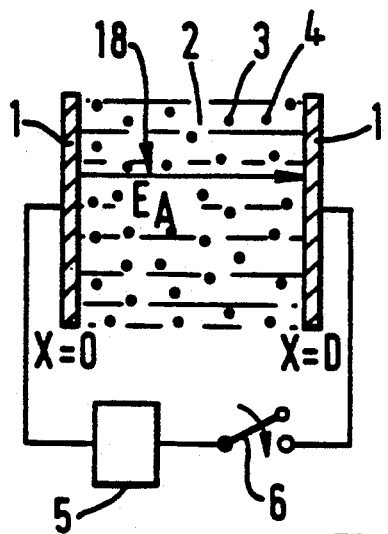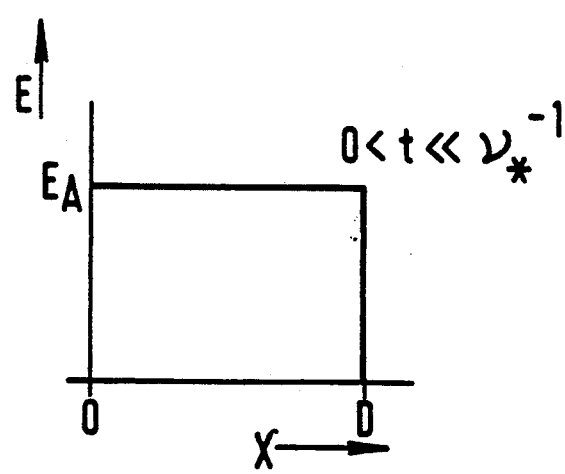
FIG. 1a.
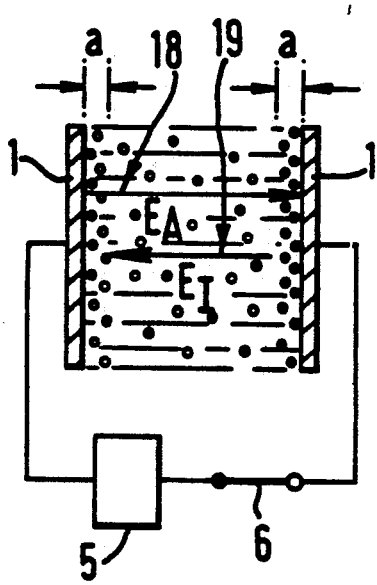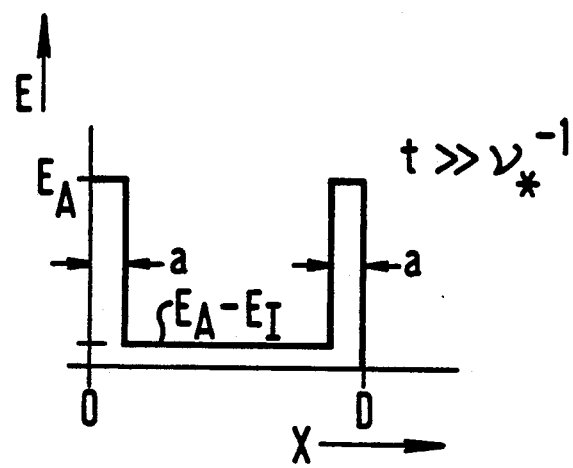
FIG. 1b.
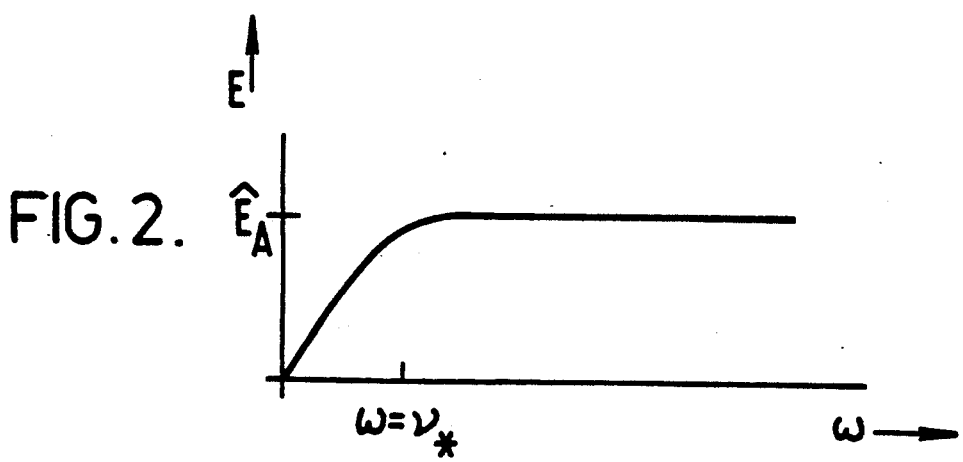
FIG. 2.

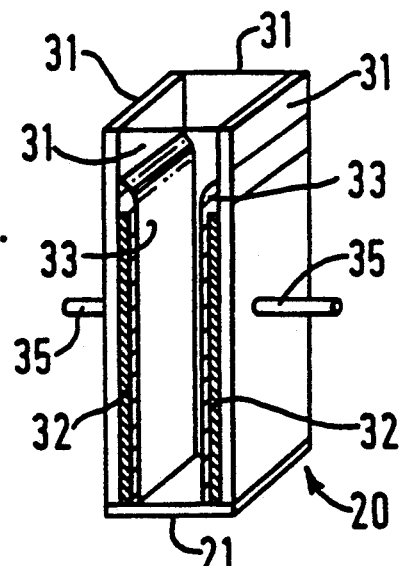
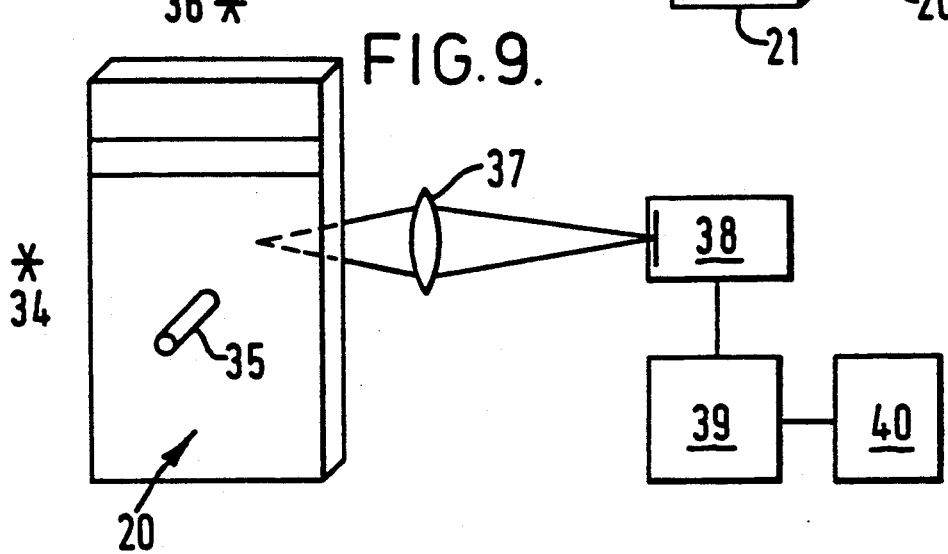
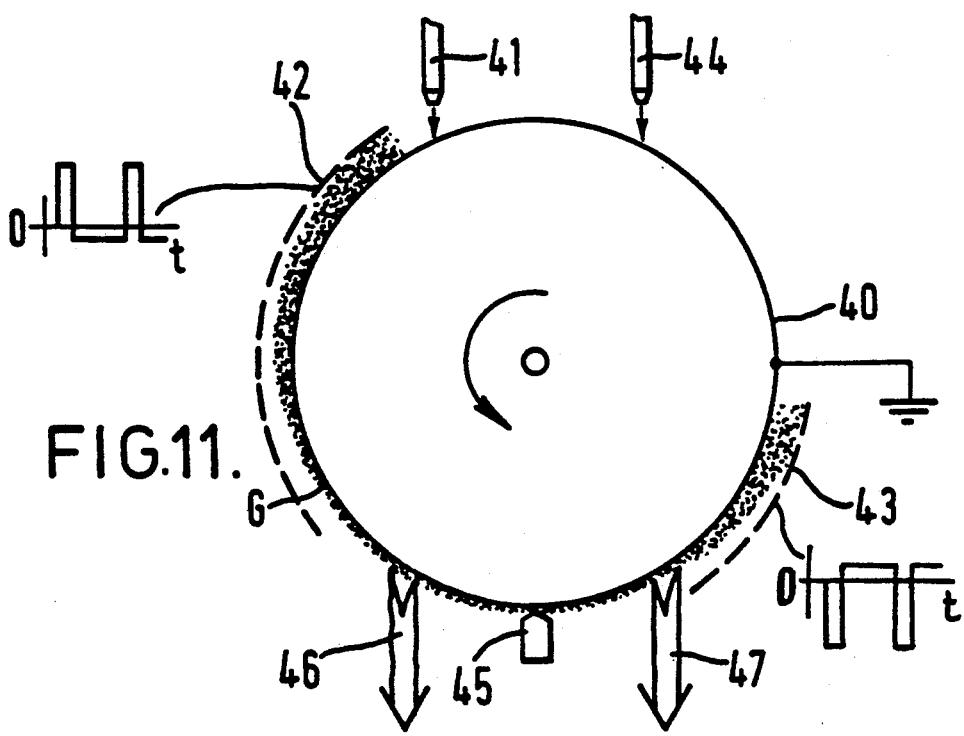

ELECTROPHORETIC SEPARATION

BACKGROUND OF THE INVENTION

This invention relates in general to a method of effecting migration, by electrophoresis, of a dispersed phase in a continuous liquid phase, but finds particular, though not exclusive, application to electrophoretic separation of the dispersed phase. One particular application is to electrophoretic separations in non-aqueous solutions.

Such techniques find important practical application for the removal of a dispersed phase from a continuous liquid phase, but, more generally, can be used merely for increasing the concentration of the dispersed phase in one locality of the fluid with corresponding reduction of dispersed phase concentration elsewhere in the continuous liquid phase. The invention, in particular, addresses the problem of electrophoretic separation of dispersed phase or contaminant in or from a continuous liquid phase which is of comparatively high conductivity, e.g. higher than about $10^{-8}$ $(\Omega.m)^{-1}$, but it also covers electrophoretic separation for liquids of lower conductivity, e.g. about $10^{-12}(\Omega.m)^{-1}$, or even insulating liquids. A preferred field of application of the invention is where the continuous liquid phase is a petroleum or hydrocarbon liquid. Such liquids, which include shale and coal liquids, residual oils and polar solvents typically exhibit conductivities in the range $10^{-12}$ to $10^{-5}(\Omega.m)^{-1}$, or more usually $10^{-10}$ to $10^{-6}(\Omega.m)^{-1}$, or $10^{-9}$ to $10^{-6}(\Omega.m)^{-1}$, or $10^{-8}$ to $10^{-6}(\Omega.m)^{-1}$, or even $10^{-7}$ to $10^{-6}(\Omega.m)^{-1}$. The dispersed phase can be a solid, liquid droplets or gas bubbles.

DESCRIPTION OF THE PRIOR ART

Electrophoretic preparation processes have been developed and used for half a century. The same forces of electrical origin have been exploited for industrial purposes in large scale electrostatic gaseous precipitators. Large scale separations in insulating liquids based upon electrophoretic and dielectrophoretic forces have been used. However, it has not been previously known how to utilize forces of electric origin for large scale industrial separations in aqueous or conductive hydrocarbon liquids. Examples of the latter are shale and coal liquids, residual oils, and polar solvents. The published conductivity limitation for present large scale, non-aqueous electrophoretic techniques seems to be about $10^{-8}$ $(\Omega.m)^{-1}$. [See for example H. J. Hall and R. F. Brown, "Lubrication Engineering", p. 488–495 December 1966)].

The conductivity of the continuous liquid phase affects the separation process detrimentally in two ways: one, a conductive liquid tends to resist penetration by an electric field, and, two, the conductive liquid acts to neutralize quickly any charge excess. Since electrophoretic forces are proportional to the product of the interior electric field (that is to say, the field which exists within the bulk of the liquid a distance from any electrical interface greater than a characteristic length called the Debye length which will be defined later) and the excess contaminant charge, it follows that the liquid conductivity can severely inhibit the effectiveness of the separation process.

For dielectrophoretic separation forces to operate, the contaminant need not be charged, although the electric field must still penetrate. U.S. Pat. No. 3,928,158 (Fritsche et al) contemplates applying DC or AC voltage to achieve separation and mentions application only to the same conductivity range, i.e. $\sigma<10^{-8}$ $(\Omega.m)^{-1}$, where $\sigma$ is the liquid conductivity.

The conductivity limitation for dielectrophoretic techniques notwithstanding, the utilization of these techniques for effecting separation of very small contaminants or at least migration to increase the contaminant concentration in one locality in the continuous liquid phase will always be difficult. For separating these smaller contaminants, however, electrophoretic techniques should, if not for the conductivity limitation, be able to exert greater forces on these contaminants.

A paper by S. Stotz, Journal of Colloid and Interface Science, Vol.65, pages 118 to 130, (1978) reports on a study of the electrophoretic mobility of a dispersed phase in a continuous hydrocarbon liquid background phase and discloses the fact that the mobility may be dependent upon the applied electric field. Stotz, however, does not use, nor does he discuss, the use of asymmetric periodic electric fields, as in the present invention, such as to produce net migration of the dispersed phase in one direction which can serve as a basis for separation of the dispersed phase from the hydrocarbon liquid in which the dispersed phase initially forms a dispersion or at least migration of the dispersed phase in the continuous phase.

Reference is also made to two cross-referenced papers, namely "AC Corona Charging of Particles" and "AC Electrostatic Precipitator", both by R. M. Ehrlich and J. R. Melcher and published on pages 1207 to 1210 and 1211 to 1214, respectively, of the "Conference Record, Industry Applications Society, IEEE-IAS-1984 Annual Meeting", IEEE Catalogue No.84 CH 2060-2, Library of Congress No.80-640527. "AC Corona Charging of Particles" shows a periodic applied voltage waveform of alternate positive and negative pulses of unequal absolute magnitude which is eventually restricted, in the mathematical analysis presented, to having equal magnitude positive and negative values. In "AC Electrostatic Precipitation", the AC voltage is applied to corona wires positioned in a stream of particle-laden air. Electric charge is injected, by corona discharge, into the stream and laterally migrating particles in the stream are collected, at a downstream location, on a migration plate to which a DC voltage is applied. Unlike the present invention, no reference is made in either of the Ehrlich and Melcher papers to effecting separation or migration of a dispersed phase in a continuous phase which, is a liquid. Furthermore, it is well known that the physics underlying the electrical behavior of ionically-conducting liquids (as in the present invention) differs significantly from the physics of corona production and charge transport in air. The Ehrlich and Melcher papers describe charging of the contaminant particles by a corona discharge as opposed to the result of causing an interaction between an electric field in an ionically conductive liquid, local to a dispersed phase species, and the bipolar ions which comprise the ionically-conducting liquid to alternately charge and discharge the dispersed phase species. In addition, corona charging is ineffective in liquids which exhibit ionic conductivity in that the ionic species comprising the liquid will act to neutralize quickly any free charges produced in the liquid by corona discharge processes. Finally, no recognition is indicated of the phenomena which occurs due to interaction between a local electric field and a dispersed phase contaminant exhibiting (experiencing) a field-dependent mobility.

Finally, reference is directed to a thesis paper, entitled "AC Electrostatic Precipitation", by R. M. Ehrlich, submitted in partial fulfillment of the requirements for the degree of Doctor of Science at the Massachusetts Institute of Technology (MIT). This thesis paper, which is understood to have first been available from the MIT archives on the 24th Aug., 1984, relates to corona discharge electrostatic precipitation similar to that as disclosed in the "AC Corona Charging of Particles" and "AC Electrostatic Precipitator" papers cited in the preceding paragraph.

SUMMARY OF THE INVENTION

The present invention is concerned with effecting migration, by electrophoresis, of a dispersed phase in a continuous liquid phase under conditions of intrinsic ionic conductivity due to intrinsic bipolar ions in the continuous phase. The term "intrinsic ionic conductivity" means that the bipolar ions arise predominantly due to the thermal and/or chemical dissociation of species comprising the continuous liquid phase (as distinct from ionic dissociation due to an applied electric field). Although the present invention, as indicated, is confined to the case of thermal and/or chemical dissociation as a majority effect, limited ionic dissociation due to local high electric fields may occur as a minority effect when putting the invention into effect. The response of the bipolar ions to the electric field producing the electrophoretic migration results in ionic conduction, even when the electric field is close to zero magnitude. The dispersed phase has to exhibit a non-constant or field-dependent mobility $\mu(E)$ when the dispersed phase-containing continuous phase is subjected in a treatment zone to an applied periodic voltage, which causes the dispersed phase to be subjected locally to an electric field $E_{in}(t)$, where t represents time, having a periodic waveform of period T. The mobility $\mu(E)$ is defined as the ratio, at any instant, of the dispersed phase migration velocity within the continuous phase due to the applied voltage to the electric field $E_{in}(t)$ experienced locally by the dispersed phase. This locally experienced field $E_{in}(t)$ is defined by the equation, $E_{in}(t) = E_o + E(t)$, where $E_o$ is a constant electric field of one polarity which may be zero and $E(t)$ is an asymmetric periodic waveform of alternate positive and negative features. Throughout this specification "asymmetric periodic waveform" is defined by the conditions:

$$\int_{t_o}^{t_o + T} E(t)dt = 0 \text{ and } \frac{1}{T_H} \cdot \int_{t_o}^{t_o + T_H} E(t)dt \neq \frac{1}{T_L} \cdot$$

$$\int_{t_o + T_H}^{t_o + T} E(t)dt,.$$

where $t_o$ is the time at which any arbitrary feature of one polarity commences and $T_H$ and $T_L$ are the time durations of the positive and negative features, respectively, where $T_H + T_L = T$, and references to "asymmetric field" and the like are to be construed accordingly. The component $E_o$ is the result of the applied voltage including a DC component. As will be explained in detail hereinbelow, the field component $E_o$ is of comparatively small magnitude, even where the DC voltage component $V_o$ is comparatively large, and has insignificant effect on the electrophoretic migration and separation of dispersed phase contaminant to be described in more detail below. Therefore, $E_{in}(t)$ is taken to be equivalent to $E(t)$ in the following description, for simplicity.

The electric field component $E(t)$ interacts with the bipolar ions to produce the field-dependent mobility $\mu(E)$ of the dispersed phase. The effect of the periodic asymmetric locally acting field, coupled with the field dependent mobility of the dispersed phase, results in a net migration, per period, of dispersed phase within the continuous phase. This migrating effect may be utilised as a separation process by collecting dispersed phase, following migration within the continuous phase, in a collection zone for separation from the continuous phase.

In an electrophoretic separation process, the dispersed phase (which may be an unwanted contaminant or may be a component of the fluid mixture which has value and for which an efficient economic recovery process is sought) can be allowed to collect on a collector surface, which can be an electrode to which the periodic asymmetric voltage is applied, positioned in the collection zone. The dispersed phase can then be separated from the continuous liquid phase by any of several known techniques such as backflushing, scraping, cleaning or regeneration where the dispersed phase is a solid (such as catalyst fines or a gel-like material such as an asphaltic precipitate or wax crystals) which adheres to or unites with the collector surface, or by buoyancy effects, such as settling or flotation and tapping off, for example in the case of dispersed droplets or gas bubbles. Alternatively, the contaminant dispersion may be such, having regard to the prevailing conditions such as dispersed phase concentration, internal dimensions of the electrical separation apparatus, physical nature of the dispersed phase, that individual migrating species of the dispersed phase (the individual species or entities of the dispersal phase in the appropriate context throughout this specification means the individual entities, i.e. gas bubbles, liquid droplets, wax crystals, precipitates and solid particles, making up the dispersion in the liquid being treated) unite when they collide to produce growth in size of the dispersed phase components within the liquid and such growth continues until at least some of the dispersed phase components separate out and accumulate in the collection zone. The dispersed phase species thereby grown in size will usually separate out by settling or flotation and can then be removed for example by mechanical filtering (for agglomerated solid particles, wax crystals or gas bubbles) by tapping off (for a settled layer of liquid droplets or gas bubbles). Batch or continuous separation techniques can be employed.

It will be appreciated that the concentration of the dispersed phase is increased in the collection zone and there will be a corresponding decrease in the concentration of dispersed phase in the remainder of the liquid phase. According to one arrangement, the liquid phase as a whole is divided so as to yield a first body of liquid with a relatively high concentration of dispersed phase, which then can be discarded if desired, and a second body of liquid having a relatively low concentration of dispersed phase which may be acceptably low or which can be processed in a second-stage electrophoretic separation process to reduce the concentration of the dispersed phase still further or recycled. This arrangement can be realised in a practical, continuous-separation, embodiment using a main conduit including an electrophoretic treatment region in which migration of dispersed phase is established electrically, the main conduit dividing into two branches at a downstream location such that these branches respectively capture and convey portions of the liquid stream of different dispersed phase concentrations.

The applied voltage, which produces the locally acting asymmetric periodic electric field E(t) inside the liquid bulk, is also asymmetric in the sense already defined in connection with the locally-acting electric field E(t). However, its frequency needs to be high enough so that it will penetrate the liquid bulk adequately, in order to establish a local electric field E(t) of adequate strength to produce the desired electrophoretic separation. The frequency of the electric field E(t) on the other hand is limited by the rate at which Debye layers form around the individual contaminants. Preferably, the frequency of the applied voltage is below that which corresponds to the rate of change of the applied voltage equalling the rate $v$ at which Debye layers form around the individual dispersed phase species but above that which corresponds to the fastest build-up rate $v^*$ of surface effects on electrode means which are used to apply said applied voltage, which surface effects reduce the locally experienced electric field within the separation zone.

Furthermore, the field dependent mobility $\mu(E)$ can arise in two ways. Firstly, providing the peak amplitude of the locally experienced electric field exceeds a critical electric field magnitude $E_c$ defined by the expression $$\frac{\mu_{ion}}{\mu(E_c)} \cdot \frac{\rho \lambda_D}{\epsilon},$$

where $\mu_{ion}$ and $\mu(E_c)$ are, respectively, the mobility of the ions in the liquid phase and the mobility of the individual dispersed phase species of the dispersed phase at the critical field $E_c$, $\rho$ is the charge density of the ions in the liquid phase, $\lambda_D$ is the Debye length associated with each individual contaminant and $\epsilon$ is the dielectric constant of the continuous liquid phase, then the mobility of the dispersed phase will be field-dependent. Alternatively, the same result will arise if the positive and negative ions in the continuous liquid phase have disparate mobilities.

The precise waveform adopted for the locally experienced electric field E(t) is not of any particular significance, but naturally certain waveform shapes, as a practical matter, are more convenient to generate than others. Preferably, therefore, the local periodic asymmetric electric field E(t) comprises alternate positive and negative rectangular pulses. The inventors have determined that the dispersed phase migration effect is maximized when the ratio of the duration of each pulse of larger magnitude to that of each pulse of smaller magnitude is from about ¼ to about ½.

Apparatus which is suitable for performing this invention needs to have means for applying a voltage waveform such as to produce an asymmetric periodic electric field E(t) acting within the bulk of the liquid to be treated. Then, migration of the dispersed phase species within the continuous liquid phase will result, due to the electrophoretic force produced by the applied voltage. For the separation of the dispersed phase from the continuous liquid phase for purposes of clarification of the liquid or recovery of the dispersed phase or both, the apparatus further requires means for collecting dispersed phase which has been subjected to the electrophoretic effect arising out of the locally experienced periodic asymmetric electric field E(t).

In one embodiment the voltage applying means comprises a pair of separated electrodes defining a treatment zone between them for the dispersed phase-laden liquid phase. Each electrode may comprise an electrically conductive plate covered with an insulating film which prevents contact between the dispersed phase-laden liquid phase and the underlying electrically conductive plate. In one preferred arrangement of this embodiment for continuous electrophoretic treatment, a main conduit is provided for carrying a stream of the dispersed phase-laden liquid phase. This main conduit includes the treatment zone, having the said two electrodes on opposite sides of the conduit. The main conduit is divided into two branch conduits downstream of the treatment zone for respectively conveying liquid phase with relatively higher and relatively lower concentrations of dispersed phase.

In another embodiment of the invention for separating a gel-like dispersed phase from a continuous liquid phase, a specific example of which is wax from lubricating oil, the collecting means comprises a rotary drum, arranged with its axis of rotation horizontal and having a filter cloth extending around the drum circumference, and means operable for rotating the drum. In addition, means are provided, such as a spray nozzle, for introducing wax-laden oil to be treated onto the drum surface. The electric field producing means is arranged to apply the periodic asymmetric voltage to the waxy oil on the drum surface, whereby wax forms a filter cake on the drum surface leaving substantially wax-free oil which streams off the drum.

From the foregoing, it will be appreciated that the invention can be summarized according to different aspects.

According to the invention from one aspect there is provided a method of effecting migration, by electrophoresis, of a dispersed phase in a continuous liquid phase under conditions of intrinsic ionic conductivity due to intrinsic bipolar ions in the continuous phase, said dispersed phase exhibiting a field-dependent mobility $\mu(E)$ when the dispersed phase-containing continuous phase is subjected in a treatment zone to an applied periodic voltage which produces the electrophoretic migration, which voltage causes the dispersed phase to be subjected locally to an electric field $E_{in}(t)$, where t represents time, having a periodic waveform of period T, said mobility $\mu(E)$ being defined as the ratio at any instant of the dispersed phase electrophoretic migration velocity to the electric field $E_{in}(t)$, wherein the locally experienced electric field $E_{in}(t)$ is defined by the equation, $E_{in}(t)=E_o+E(t)$, wherein $E_o$ is a constant electric field of one polarity which may be zero and E(t) is an electric field component having an asymmetric periodic waveform of alternate positive and negative features, where "asymmetric periodic waveform" is defined for E(t) by the conditions $$\int_{t_o}^{t_o + T} E(t)dt = 0 \text{ and } \frac{1}{T_H} \cdot \int_{t_o}^{t_o + T_H} E(t)dt \neq \frac{1}{T_L} \cdot$$

-continued $$\int_{t_o + T_H}^{t_o + T} E(t)dt.$$

where $t_o$ is the time at which any arbitrary feature of one polarity commences and $T_H$ and $T_L$ are the time durations of the positive and negative features, respectively, where $T_H + T_L = T$, said electric field component interacting with said bipolar ions to produce said field-dependent mobility for effecting said migration.

Another aspect of the invention provides a method for electrophoretic separation of a contaminant from a continuous liquid phase under conditions of intrinsic ionic conductivity due to intrinsic bipolar ions in the continuous phase, the ionic conductivity of the continuous liquid phase being greater than about $10^{-12}$ $(\Omega.m)^{-1}$, the contaminant forming a dispersed phase in the continuous liquid phase, said contaminant exhibiting a field-dependent mobility $\mu(E)$ when the contaminant-containing liquid phase is subjected in a treatment zone to an applied voltage which produces electrophoretic migration of the contaminant within the continuous liquid phase, said voltage causing the contaminant to be subjected locally to an electric field $E_{in}(t)$, where t represents time, said electric field $E_{in}(t)$ having a periodic waveform of period T, said mobility $\mu(E)$ being defined as the ratio, at any instant, of the contaminant migration velocity within the liquid phase due to the applied voltage to the electric field $E_{in}(t)$ experienced locally by the dispersed phase, said method comprising selecting the waveform of the applied voltage such that the locally experienced electric field $E_{in}(t)$ has a periodic waveform of alternate positive and negative features of which the mean amplitudes of the positive and negative features are unequal but the time-integrated component of the locally experienced electric field over one period T is zero, said electric field $E_{in}(t)$ interacting with said bipolar ions to produce said field-dependent mobility $\mu(E)$, whereby net migration of contaminant occurs within the liquid phase, said method further comprising collecting contaminant, following migration within the liquid phase, in a collection zone and separating the collected contaminant from the liquid phase.

According to a third aspect of the invention there is provided a method for electrophoretic separation of a contaminant from a liquid under conditions of intrinsic ionic conductivity due to intrinsic bipolar ions in the liquid, the ionic conductivity of the continuous liquid phase being greater than about $10^{-12}$ $(\Omega.m)^{-1}$ the contaminant forming a dispersed phase in the liquid, said contaminant experiencing a field-dependent mobility when the contaminant-containing liquid is subjected in a treatment zone to an applied voltage of period T which produces electrophoretic migration of the contaminant within the liquid, said mobility being defined as the ratio, at any instant, of the contaminant migration velocity within the liquid phase due to the applied voltage to the electric field experienced locally by the contaminant due to the applied voltage, said method comprising the steps of:

(i) applying said periodic voltage to the contaminant-containing liquid in the treatment zone, said voltage comprising a constant component, which may be zero, together with a periodic asymmetric component of period T, comprising a succession of alternate positive and negative features, whose time-integrated amplitude over one period is zero but of which the mean amplitudes of the positive and negative features in each period are unequal, said periodic asymmetric component interacting with said bipolar ions to produce said field-dependent mobility, whereby to bring about net migration of contaminant within the liquid phase, and (ii) collecting contaminant, following migration within the liquid, in a collection zone for separation from the liquid.

According to a fourth aspect of the invention there is provided a method for electrophoretic separation of a contaminant from a conductive liquid whose conductivity exceeds about $10^{-12}$ $(\Omega.m)^{-1}$, under conditions of intrinsic ionic conductivity due to intrinsic bipolar ions in the liquid, said contaminant forming a dispersed phase in said conductive liquid, said method comprising the steps of:

(i) applying a voltage of pre-determined periodic waveform to contaminant-containing conductive liquid in a separation zone for producing electrophoretic migration of the contaminant within the conductive liquid, said applied voltage causing said dispersed phase contaminant to experience locally a periodic asymmetric electric field of alternate positive and negative rectangular pulses of different absolute magnitudes and zero time-integrated magnitudes over one period, the magnitude of the pulse of larger absolute magnitude exceeding a critical electric field magnitude $E_c$ defined by the expression $$E_c = \frac{\mu_{ion}}{\mu(E_c)} \cdot \frac{\rho \lambda_D}{\epsilon},$$

where $\mu_{ion}$ and $\mu(E_c)$ are, respectively the mobility of the ions in the conductive liquid and the mobility of the individual contaminants of the dispersed phase at the critical field $E_c$, mobility being the ratio, at any instant, of ion or contaminant velocity to the locally-experienced electric field, $\rho$ is the charge density of the ions in the conductive liquid, $\lambda_D$ is the Debye length associated with each individual contaminant and $\epsilon$ is the dielectric constant of the conductive liquid, said locally experienced field causing said dispersed contaminant to migrate within the conductive liquid, and (ii) collecting contaminant, following migration within the liquid phase, in a collection zone for separation from the conductive liquid.

A still further aspect of the invention provides a method for electrophoretic separation of a contaminant from a conductive liquid whose conductivity exceeds about $10^{-12}$ $(\Omega.m)^{-1}$, under conditions of intrinsic ionic conductivity due to intrinsic bipolar ions in the liquid and whose positive and negative ions display disparate ionic mobilities where mobility is defined as the ratio, at any instant, of ion velocity to electric field acting locally on the ions as a result of a voltage applied to contaminant-containing conductive liquid in a separation region, said contaminant forming a dispersed phase in said conductive liquid, said method comprising the steps of:

(i) applying said voltage to the contaminant-containing conductive liquid for producing electrophoretic migration of the contaminant within the conductive liquid, said applied voltage having a selected periodic waveform such as to cause said contaminant to experience locally a periodic asymmetric electric field of alternate positive and negative rectangular pulses of different absolute magnitudes but a zero time-integrated magnitude over one period T of said locally experienced electric field; and (ii) collecting contaminant, following migration within the liquid phase, in a collection zone for separation from the conductive liquid.

A sixth aspect of the invention provides apparatus for effecting migration, by electrophoresis, of a dispersed phase in a continuous liquid phase under conditions of intrinsic ionic conductivity due to intrinsic bipolar ions in the continuous liquid phase, said dispersed phase exhibiting a field-dependent mobility $\mu(E)$ when the dispersed phase-containing continuous phase is subjected in a treatment zone to an applied periodic voltage which produces electrophoretic migration of the dispersed phase within the continuous liquid phase, said voltage having a periodic waveform of period T, said mobility $\mu(E)$ being defined as the ratio at any instant, of the dispersed phase electrophoretic migration velocity to the electric field $E_{in}(t)$ experienced locally by the dispersed phase, said apparatus comprising:

(i) means for containing a quantity of dispersed phase-containing liquid; and (ii) means for applying a voltage to the dispersed phase-containing liquid phase such that the dispersed phase locally experiences an electric field $E_{in}(t)$ which is defined by the equation $E_{in}(t) = E_o + E(t)$, where $E_o$ is a constant electric field of one polarity which may be zero and $E(t)$ is an electric field component having an asymmetric periodic waveform of alternate positive and negative features where "asymmetric periodic waveform" is defined by the conditions $$\int_{t_o}^{t_o + T} E(t)dt = 0 \text{ and } \frac{1}{T_H} \cdot \int_{t_o}^{t_o + T_H} E(t)dt \neq \frac{1}{T_L} \cdot$$

$$\int_{t_o + T_H}^{t_o + T} E(t)dt,$$

where $t_o$ is the time at which any arbitrary feature of one polarity commences and $T_H$ and $T_L$ are the time duration of the positive and negative features, respectively, where $T_H + T_L = T$, said electric field component $E(t)$ interacting with said bipolar ions to produce said field-dependent mobility $\mu(E)$, so as to produce said electrophoretic migration, the voltage applying means comprising a pair of mutually separated electrodes defining said treatment zone between them, each electrode comprising an electrically-conductive plate covered with an insulating layer which prevents contact between the dispersed phase-containing liquid phase and the underlying electrically-conductive plate.

The invention described may be summarized most generally as an electrical method to produce an electrophoretic effect acting on a dispersed phase in a continuous liquid phase. The direction of this motion may be reversed by reversing the polarity of the applied voltage. The continuous phase may be partially or totally comprised of hydrocarbon liquid. The dispersed phase may be comprised of solid, liquid, gaseous, or gel-like substances. The volume fraction of the dispersed phase may range from approximately $1 \times 10^{-6}$ to $5 \times 10^{-1}$. The electrodes between which the voltage is applied in the separation zone may be separated from the liquid by an insulating layer or coating and thus need not be in electrical contact with the liquid being electrically treated.

Application areas for this invention include: the clarification and purification of liquids by the separation of the dispersed phase by agglomeration and/or impact on and adhesion to the surfaces which form the liquid boundaries or by concentration of the dispersed phase in a specific region occupied by the original or a second liquid and subsequently physically separating the two continuous liquid phases; the recovery of dispersed phases by the methods described above and by causing the dispersed phase to form a second continuous phase in the case that the original dispersed phase is a liquid; the generation or regeneration of clean surfaces upon which a dispersed phase has adhered. Further application areas include those which depend upon inhomogeneities in the properties of the phase mixture which may be induced by the pulsed asymmetric fields. These induced inhomogeneities may lead to enhanced viscosity, electrical and thermal conductivity and scattering of electro-magnetic and acoustic radiation.

Specific examples of some of these application areas follow. It will be apparent that the examples described are neither exhaustive nor complete and many variations and combinations of these examples are possible as will be evident to those skilled in the art.

First, the most direct application is the clarification of a liquid by the separation of an unwanted dispersed solid, liquid, or gel contaminant phase from a continuous liquid phase. The generic clarification process may be considered to occur in two stages. The first stage consists in the modification of the initial contaminant density distribution so as to result in the contaminants agglomerating in the bulk or at or near fluid boundaries. The second stage in the process involves the separation of the two phases. By way of example this commonly involves settling of the agglomerated contaminants to form a second distinct phase if the contaminants are liquid, or a dense compact phase if the agglomerates are solid or gel-like.

The first stage in the separation process may readily be accomplished by flowing the contaminated liquid through an array of substantially plane-parallel electrodes each coated with a thin layer ($\sim 10$ $\mu$) of pin-hole-free insulating material so as to prevent the passage of DC currents. The contaminant-laden liquid may be made to flow between the electrode array (continuous separation) or the liquid may be static with respect to the electrode array (batch separation). The pulsed asymmetric fields having a maximum amplitude which is limited by the dielectric breakdown strength of the liquid (typically $10^6$ to $10^7$ V/m) may be produced in such a way so as to cause the particles to collect on one of the electrodes, to agglomerate at or near one of the electrodes, or to agglomerate in the bulk of the liquid. With regard to the agglomeration in the bulk of the liquid, the smaller diameter contaminants in the dispersed phase by virtue of their different mobilities and settling rates, can be made to, agglomerate with larger diameter contaminants which may be present naturally or may intentionally be added as a collection "aid".

By way of example, let us consider the particles in a contaminated fluid having been collected on one of the electrodes. After a period of time has elapsed where the electrodes have been substantially coated with a layer of contaminants, the electric field is switched off and the agglomerated contaminants at the vertical electrodes no longer being held against these electrodes by forces of electric origin, will be re-entrained into the stream or settle by gravity to form a layer at the bottom of the vessel from which the clarified liquid may be drawn out of the vessel.

In the event that the dispersed contaminant phase is a liquid such as water droplets in a lube oil, the electrodes may comprise a membrane which is selectively permeable to water or a porous medium, such as silica gel or cellulose acetate, the pores of which are maintained saturated with water. Application of the pulsed asymmetric field will drive the water droplets to the membrane surface where the water droplets will permeate the electrode and thereby be removed from the oil.

Alternatively, the electrodes may be comprised of metallic structures whose surfaces which are exposed to the liquid stream to be clarified are treated to form insulating, non-water wetting, hydrophobic surfaces. The pulsed asymmetric fields are used to coalesce the water droplets at the electrode surfaces. Due to the hydrophobic coating on the electrodes, the coalesced droplets will not adhere to the electrodes but settle due to gravity along the electrode structure to the bottom of the vessel where further coalescence may be made to occur by conventional means to produce a distinct second continuous phase which then may easily be separated from the original continuous phase liquid.

In any of the aforementioned techniques, contaminants which have collected on either of the electrodes may be driven off and back into the fluid by reversing the polarity of the asymmetric pulses. In this manner, the electrodes may be regenerated. During this regeneration operation, a second fluid may be made to flow through the separation chamber. The contaminants can therefore be concentrated in this second "wash" fluid.

DESCRIPTION OF THE DRAWINGS

For a better understanding of the invention and to show how the same may be carried into effect, reference will now be made, by way of example, to the accompanying drawings, wherein:

FIG. 1a is a diagram of an electric circuit, which applies a voltage or potential difference between a pair of electrodes separated by a body of intrinsically conductive liquid containing randomly distributed positive and negative ions, and also shows the electric field distribution between the electrodes shortly after closing the electric circuit;

FIG. 1b corresponds with FIG. 1a but indicates the electric effects which occur after a comparatively long time lapse;

FIG. 2 indicates the electric field penetration in the conductive liquid as a function of the frequency of the applied voltage;

FIG. 8 is a diagrammatic perspective view of one form of electrophoretic separation cell;

FIG. 9 is a schematic, part perspective and part block-diagram, view of one embodiment of the invention;

FIG. 11 is a diagrammatic end view of another embodiment suitable for separating wax crystals from lubricating oil.

DETAILED DESCRIPTION OF THE PREFERRED EMBODIMENTS

Figure 3:
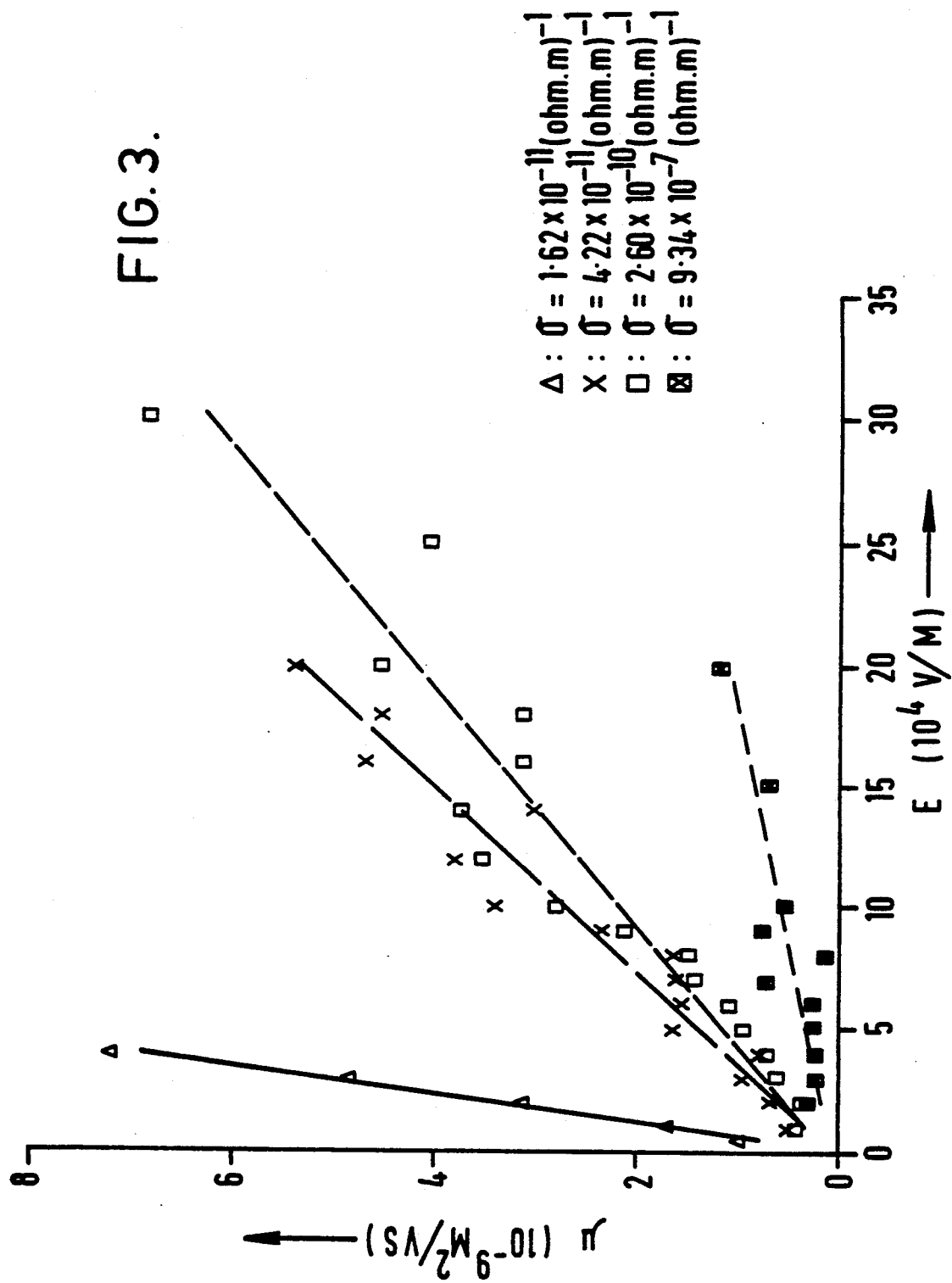
FIG. 3 presents experimental data for oil with added surfactant in various amounts to yield differing conductivities to show how the mobility of latex spheres in the oil is field-dependent.

Reference will firstly be made to FIGS. 1a and 1b, which both show the same electric circuit which comprises a DC voltage source 5, a load comprising a pair of spaced-apart electrodes 1 with a conductive liquid 2 filling the space between the electrodes, and an on-off switch 6. One of the electrodes is at position $x=0$ while the other is at $x=D$. When the switch 6 is open, positive ions 4 and negative ions 3 of liquid are distributed statistically uniformly throughout the liquid, as indicated in FIG. 1a. Initially (i.e. at time $t=0$), switch 6 is closed to apply the DC voltage across the electrodes and the resulting electric field $E=E_A$ (denoted by reference numeral 18 in FIG. 1a) across the liquid is uniform (neglecting electrode edge effects) throughout the liquid as shown schematically in FIG. 1a. However, positive and negative ions which comprise the conductive liquid migrate towards the (negative and positive, respectively) electrodes under the action of the applied field and may accumulate at the electrodes as indicated in FIG. 1b. These ion layers adjacent to the electrodes act to produce a cancelling electric field, shown as $E_f$ in FIG. 1b, (and denoted by reference numeral 19), and shield the bulk of the liquid from the value of, the field, $E_A$, which is produced initially upon application of the DC voltage and which would continue to exist in the absence of migrating ions in the liquid leading to a build-up of ions at the electrode surfaces. The resulting electric field which exists within the bulk of the fluid (that is, at any point in the fluid which is a greater distance from any interface than the characteristic ion layer thickness or Debye length, shown at a in FIG. 1b) is $E_{in}=E_A-E_f$.

Only if the electrodes make good electrical contact with the liquid are these charges, which are due to the ion layers, rapidly discharged so that they do not accumulate at the electrodes. However, electro-chemical reactions may occur on the electrode surfaces resulting in a buildup of insulating layers thereby destroying the good electrical contact. Such reactions, including oxidation, are likely to occur with time in large systems, even in the absence of fields, and possibly more rapidly in the presence of fields.

If we call $v^*$ the rate of the fastest of the several processes described above which might occur to build up electrode layers which reduce the electric field in the liquid interior, then for times greater than the inverse of this rate, i.e. $t > v^{*-1}$, the amplitude of the electric field which exists in the bulk of the liquid is distorted, as shown in FIG. 1b for the case where $t \gg \nu^{*-1}$, that is, reduced in amplitude compared with that produced at the instant the DC voltage is applied to the electrodes. In effect, then, the conductive liquid may be said to resist penetration of the DC field for times greater than $\nu^{*-1}$. The electric field is equal to the applied field only over the width of the electrode layers and is reduced in the liquid interior to the value $E_{in}$.

The existence of a critical build up rate, $\nu^*$, suggests that if an oscillating field is applied with frequency $\omega > \nu^*$, then the electric field distortion can be reduced to comparatively insignificant levels and if $\omega \gg \nu^*$ the magnitude of the interior electric field would remain equal to that obtained in the absence of of electrode layer build-up processes due to mobile ions in the liquid. Under these conditions, then, the electric field may be said to penetrate the interior of the liquid. Analysis shows that for an applied voltage producing sinusoidal electric field $E_A = \hat{E}_A \sin \omega t$, in the limit where the two electrode layers are completely insulating, the magnitude of the interior electric field, $E_{in}$, is zero for zero-frequency (DC) fields, increases linearly with increasing frequency at first, and approaches a constant value at $\omega > \nu^*$, as shown in FIG. 2. In the case of a perfectly insulating layer, $\nu^* = 2a\nu/L$ where a=thickness of each insulating layer, L=electrode separation, and $\nu$=charge relaxation rate.

Thus, oscillation of the applied voltage at a frequency $\omega > \nu^*$ ensures penetration of the fluid since the positive and negative ions comprising the conductive liquid oscillate symmetrically in the electric field and do not migrate to the electrodes. Ions originating near the electrodes might still undergo a chemical reaction at the electrodes. Therefore, it is preferred to intentionally coat the electrodes with a thin layer of chemically inert insulating material. Examples of suitable materials include polytetrafluoroethylene commercially available under the trade name "Teflon", glass ($SiO_2$), and alumina ($Al_2O_3$). The inventors have shown above that an electric field oscillating at $\omega > \nu^*$ will penetrate these electrode layers which are themselves completely insulating to current flow.

While fluid penetration can be achieved by oscillatory electric fields, they are not sufficient to achieve net unidirectional migration of a dispersed contaminant phase having a constant charge. It is to be expected that the dispersed phase contaminants having a constant charge will behave as an ion of the fluid and simply symmetrically oscillate about some point. An asymmetry in some property of the charged contaminants which would affect the magnitude and direction of its motion such as the steady-state charge level or mobility needs to be created. One way in which this asymmetry can be achieved will now be described.

The method is based upon an alteration, by the applied voltage, of the atmosphere of counter-ions in the liquid which surrounds the charged contaminants. The result of this alteration is to impart a field dependence to the mobility of the contaminant phase. The mobility is defined as the ratio, at any instant, of the contaminant velocity to the electric field which the charged contaminant experiences.

A charged particle (say, positively charged for illustrative purposes) immersed in a conductive liquid is surrounded by an atmosphere of counter-ions which extends a distance, $\lambda_D$, (known as the Debye length) from the surface of the particle and builds up around the particle at the charge relaxation rate, $\nu$. This rate depends upon the liquid conductivity, $\sigma$, and dielectric constant, $\epsilon$; specifically, $\nu = \sigma/\epsilon$.

An electric field, $E_o$, exerts forces on the particle and its counter-ion atmosphere which results in a relative displacement of the centers of charge. This displacement causes an additional force to occur which tends to restore the symmetry of the original configuration. The force which acts on the particle ($F_1$) and its ion atmosphere ($F_2$) is simply the Coulomb force, $$F_1 = -F_2 = QE_o \quad (1)$$

where Q is the particle charge.

The restoring force, $F_3$, is given by $$F_3 = \frac{QQ_c}{X^2} \quad (2)$$

where X is the displacement of the centers of charge of the particle and its ion atmosphere, assuming that the distortion of the ion atmosphere by the applied field is negligible, and where $$Q_c \approx -Q\left(\frac{X}{\lambda_D}\right)^3, X \leq \lambda_D \quad (3a)$$

$$= -Q, X \geq \lambda_D \quad (3b)$$

The value of X is the distance which the particle moves in a build-up time, $\tau$, of the ion atmosphere at the displaced position of the particle. This time, $\tau$, is just the inverse of the build-up rate, $\nu$, which was defined earlier. Thus, $$\tau = 1/\nu$$

and since $\nu = \sigma/\epsilon$, $$\tau = \epsilon/\sigma$$
$$= \epsilon/\rho\mu_{ion}$$

where, in the last expression, $\rho$ and $\mu_{ion}$ are the charge density and mobility, respectively, of the ions in the conductive liquid.

The distance, X, then is $$X = \mu E_o \tau \quad (4)$$

$$X = \frac{\mu}{\mu_{ion}} \cdot \frac{E_o}{\rho}$$

where $\mu$ is the dispersed phase particle mobility. The restoring force is, for small displacements $X(\leq \lambda_D)$ using equations (1), (3a) and (4) in equation (2)

$$F_3 = -F_1 \frac{1}{n\lambda_D^3} \cdot \frac{Q}{e} \cdot \frac{\mu}{\mu_{ion}} \quad (5)$$

since, $\rho = ne$ for assumedly singly charged ions where n is the ion number density and e is the charge on the electron.

The steady-state velocity, $v_p$, of the contaminant particle in the field $E_o$ is the result of three components. The first, $v_1$, is obtained by equating the electrical force exerted on the dispersed phase particle of radius, $R_p$, to the viscous drag force exerted by the liquid with viscosity, $\eta$; thus, $$6\pi\eta R_p v_1 = QE_o \tag{6}$$

$$v_1 = \frac{QE_o}{6\pi\eta R_p}$$

The liquid in the vicinity of the dispersed phase particle, however, is not stationary but is moving in the opposite direction with velocity, $v_2$, due to the action of the electric field on the counter-ion atmosphere; thus, $$v_2 = \frac{QE_o}{6\pi\eta(R_p + \lambda_D)} \tag{7}$$

In addition, the restoring force, $F_3$, described in equation (5) results in a velocity component, $v_3$, which also acts opposite to $v_1$. This restoring velocity, $v_3$, is given by $$v_3 = \frac{QE_o}{3\pi\eta R_p} \cdot \frac{1}{n\lambda_D^3} \cdot \frac{Q}{e} \cdot \frac{\mu}{\mu_{ion}} \tag{8}$$

The net particle velocity, $v_p$, is $$v_p = v_1 - v_2 - v_3$$

and, using equations (6)–(8), becomes $$v_p = \frac{QE_o}{6\pi\eta R_p}\left[1 - \frac{R_p}{R_p + \lambda_D} - \frac{1}{n\lambda_D^3}\cdot\frac{Q}{e}\cdot\frac{\mu}{\mu_{ion}}\right], X \leq \lambda_D \tag{9}$$

The mobility, $\mu$, of the particle, may be defined using equation (9) as $$\mu = \frac{Q}{6\pi R_p}\left[1 - \frac{R_p}{R_p + \lambda_D} - \frac{1}{n\lambda_D^3}\cdot\frac{Q}{e}\cdot\frac{\mu}{\mu_{ion}}\right], X < \lambda_D \tag{10}$$

In the case that the local field at the particle is sufficiently high to cause the centers of charge to be displaced by a distance greater than D, the restoring force becomes $$F_3 = F_1 \frac{Q_p^2}{\epsilon^3}\cdot\left(\frac{\mu_{ion}}{\mu}\right)^2 \cdot \frac{1}{E_o^3}, X \geq \lambda_D \tag{11}$$

Thus, the restoring force becomes negligible for large values of the applied field and the particle mobility becomes enhanced. In this regard, reference is directed to S. Stotz, "Journal of Colloid and Interface Science", 65, 118 (1978). The dependency of the mobility of the particle on the locally acting electric field, E(t), is represented by the notation, $\mu(E)$ for the particle mobility. In the description which follows, however, $\mu(E)$ is abbreviated to $\mu$ in some instances, for simplicity.

An example of field-dependent particle mobility which the present inventors have measured is shown in FIG. 3. The data presented are for latex spheres with radius $R_p = 3$ $\mu$m dispersed in an oil of mixed isoparaffins (Isopar K) with a viscosity of $2\times 10^{-3}$ kg.m$^{-1}$s$^{-1}$. A surfactant, sodium dodecyl sulfosuccinate (Aerosol OT) was added in various amounts to alter the conductivity, $\sigma$, of the continuous phase. The data points indicated by triangles represent the variation of the mobility, $\mu$, of the latex spheres with an electric field, E, calculated by dividing the applied voltage by the spacing between the electrodes, for a continuous phase conductivity, $\sigma$, of $1.62\times 10^{-11}$ (ohm.m)$^{-1}$. The cross, square, and crossed-square data points represent corresponding data plots for conductivity values of $4.22\times 10^{-11}$, $2.60\times 10^{-10}$ and $9.34\times 10^{-7}$ (ohm.m)$^{-1}$, respectively. The conductivity value $\sigma = 1.62\times 10^{-11}$ (ohm.m)$^{-1}$ is representative of lubricating oil while $\sigma = 9.34\times 10^{-7}$ (ohm.m)$^{-1}$ is within a factor of 50 of aqueous solutions. In each case, the data points indicate a linear field-dependent mobility of the latex spheres over a wide range of liquid conductivity.

The existence of a field-dependent mobility of the dispersed contaminant phase, demonstrated analytically and experimentally above, in combination with an applied sinusoidal voltage which penetrates a continuous liquid containing dispersed particles does not in itself result in unidirectional particle migration. The reason is that for sinusoidal electric fields, whatever motion the particle undergoes when the field is in one direction, that motion will be reversed as the field direction is reversed.

Figure 4:
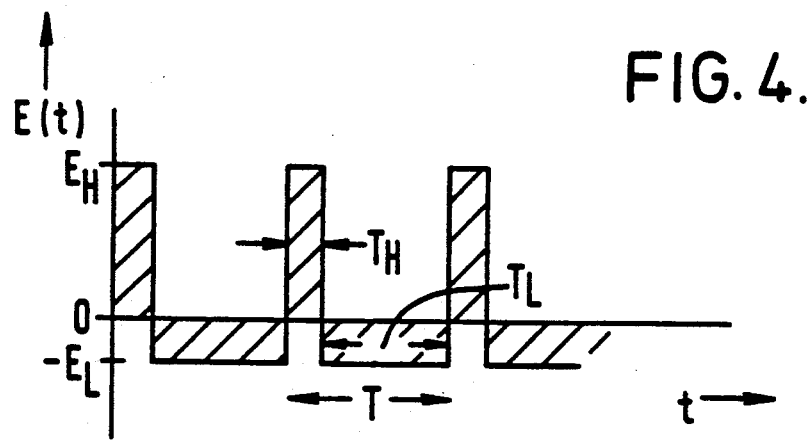
FIG. 4 shows a preferred waveform for the locally acting periodic asymmetric electric field and also a diagram indicating the migration as a function of time of the dispersed phase.

An essential requirement of the present invention is that an asymmetry in the particle motion is introduced. One way in which this can be achieved is by applying a voltage in the form of periodic temporally asymmetric rectangular pulses as shown in FIG. 4 to a system, such as just described, having a field-dependent mobility. The pulsed voltage waveform produces an electric field whose waveform consists of a high field portion with amplitude $E_H$ and width $T_H$ and a low field portion of opposite polarity with magnitude $E_L$ and width $T_L$. The period of the pulse waveform is T, where $T = T_H + T_L$.

There are several constraints on the amplitude and width parameters of the pulse waveform. One set of constraints is imposed by the requirements for field penetration and, specifically, for field penetration in a preferred embodiment in which insulated electrodes are used for producing the electric field E(t). This requires that there be no time-average value over one cycle of the component E(t) of the electric field $E_{in}(t)$ and that all frequency components must be greater than the electrode layer build-up rate. The first condition may be satisfied by:

$$E_H T_H = E_L T_L \tag{12}$$

and the second by $$v^* T \leq 1 \tag{13}$$

If the above two conditions are satisfied then the field will penetrate the fluid. In addition the field-dependent particle mobility, $\mu(E)$, will lead to net, unidirectional migration because as shown in FIG. 4 during the high field part of the pulse ($E_H$), the particle will move with velocity $v_H = \mu_H E_H$ for a time $T_H$ while the lower field of reversed polarity will cause the particle to move in the opposite direction with velocity $v_L = \mu_L E_L$ for a time $T_L$. The net distance travelled per cycle is $$L = L_H - L_L = v_H T_H - v_L T_L = \mu_H E_H T_H - \mu_L E_L T_L \tag{14}$$

$$L = (\mu_H - \mu_L) E_H T_H$$

where the last equation is obtained by using the condition $E_H T_H = E_L T_L$. Since $\mu_H$ is greater than $\mu_L$ for a particle with a field-dependent mobility, both $(\mu_H - \mu_L)$ and, hence, L are greater than zero. Thus, there is net unidirectional migration of the dispersed contaminant by a distance L during each pulse of duration T.

Figure 5:
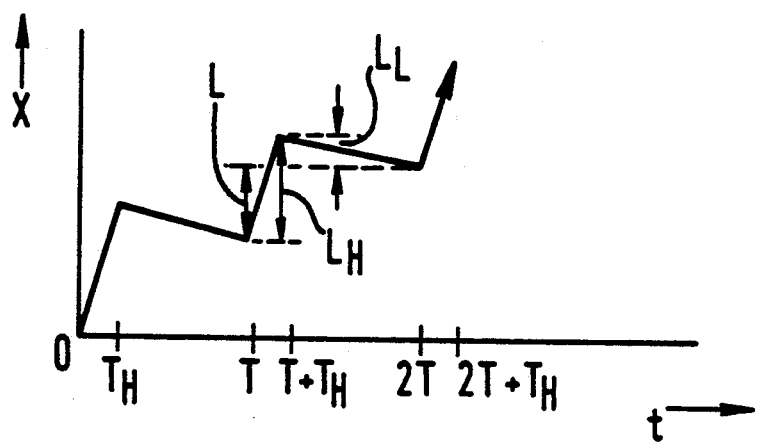
FIG. 5 illustrates the most general periodic asymmetric waveform for the locally experienced electric field E(t)

To summarize in this embodiment, net unidirectional migration of the dispersed contaminant is achieved (i) by virtue of the dispersed phase exhibiting a field-dependent mobility, (ii) by applying a periodic asymmetric pulsed voltage which creates within the liquid an electric field of similar waveform such that the magnitude times pulse width product is the same for the positive and negative-going pulses but the magnitudes of the positive and negative pulses are different (it is immaterial whether it is the positive or the negative pulse magnitudes which are the larger except for the determination of the direction of contaminant migration), and (iii) by selecting a sufficiently high frequency for the applied voltage, such that the field created by said voltage penetrates into the bulk of the liquid between the electrodes to establish a locally-acting periodic asymmetric field there. It is not essential that the applied voltage comprise a succession of alternate positive and negative rectangular pulses. The applied voltage could actually be any asymmetric periodic waveform, e.g. comprising alternate sinusoidal half waveforms, each of different amplitude and angular velocity. Furthermore, the voltage applied has to be below the threshold for producing ionic dissociation in the liquid between the electrodes (although ionic dissociation on a small scale produced by local high electric fields may occur in some embodiments of the invention, providing the effect of such localized ionic dissociation is negligible). Additionally, the applied voltage waveform could include a DC component. The electric field resulting from that DC component would not penetrate to any significant degree into the bulk of the liquid (although it would give rise to a small unidirectional field, $E_o$, represented in FIG. 1b by $E_X=E_A-E_I$) but the asymmetric periodic component would do so, resulting in the required net migration of the dispersed phase. From the point of view of the component $E(t)$ of the locally-acting electric field $E_{in}(t)$, i.e. the field acting in the liquid bulk directly on the dispersed phase, that locally-acting field component $E(t)$ will generally correspond with the asymmetric periodic component of the applied voltage. Generally speaking, the locally-acting field component, $E(t)$, must satisfy the requirements that the time average component of each positive feature of the waveform is equal to that of each negative feature of the waveform but the mean amplitude of each positive feature is different from that of each negative feature. Referring to FIG. 5, there is illustrated the most general base of a periodic asymmetric locally-acting field component $E(t)$. Consider a period T, starting at time t, and let $t_o$ denote the previous time when a feature of one polarity (in this case a positive feature) of the waveform was just commencing. $T_H$ is the duration of the positive feature and $T_L$ that of the next negative feature, where $T_H+T_L$ equals T. In order that there be no DC nor time-integrated component of the electric field.

$$\int_t^{t+T} E(t)dt = 0$$

Since the time-integrated component between $t_o+T$ and $t+T$ is identical to that between $t_o$ and t, this condition can be expressed as:

$$\int_{t_o}^{t_o+T} E(t)dt = 0 \tag{15}$$

Furthermore, the requirement for asymmetry, to produce net unidirectional migration of the dispersed phase, can be expressed as the requirement that the mean amplitude of the positive feature(s) over one period T, of the waveform is not equal to the mean amplitude of the negative feature(s) over the same period. Expressed mathematically:

$$\frac{1}{T_H}\left[\int_t^{t_o+T_H} E(t)dt + \int_{t_o+T}^{t+T} E(t)dt\right] \neq \frac{1}{T_L}\int_{t_o+T_H}^{t_o+T} E(t)dt$$

Since the mean amplitude between $t_o+T$ and $t+T$ is identical to that between $t_o$ and t, this second requirement simplifies to:

$$\frac{1}{T_H}\cdot\int_{t_o}^{t_o+T_H} E(t)dt \neq \frac{1}{T_L}\cdot\int_{t_o+T_H}^{t_o+T} E(t)dt$$

Providing conditions (15) and (16) are satisfied for the locally acting field $E(t)$ and having regard to the fact that the mobility $\mu(E)$ of the dispersed phase is field-dependent, there will occur net unidirectional migration of the dispersed phase since.

There is a preferred "window" in the field amplitude and frequency parameter space for the separation process described herein. In addition, there is a preferred range of contaminant particle size and liquid charge density for the performance of the separation process described herein to be optimized.

First, the value of the locally-experienced electric field, $E_c$, for which we expect the restoring force to change its dependence on the center of charge separation from linear to inverse-square may be estimated by equating equations (5) and (11) and replacing $\mu$ by $\mu(E_c)$ where $\mu(E_c)$ is the mobility of the dispersed phase existing at the critical field $E_c$; thus $$E_c = \frac{\mu_{ion}}{\mu(E_c)}\cdot\frac{\rho\lambda_D}{\epsilon} \tag{17}$$

An approximation to the solution of equation (17) may be made by equating $\mu(E_c)$ to $\mu_L$. Hence:

$$E_c \approx \frac{\mu_{ion}}{\mu_L}\frac{\rho\lambda_D}{\epsilon} \tag{17a}$$

In order to move the contaminant particles a large distance during each period of the pulsed field, the difference in mobilities $\mu_H-\mu_L$, in equation (14) should be made as large as possible. This implies choosing $E_H>>E_c$ and $E_L<<E_c$. The maximum value of $E_H$ possible is determined by the breakdown field strength of the liquid. The value of $E_L$ is then constrained, see equation (12), by the condition $$E_L = E_H \frac{T_H}{T_L}$$

The frequency components of the pulsed fields which are most effective in causing particle motion are those related to the pulse width parameters $T_L$ and $T_H$. Specifically the frequency components should lie approximately between $T_H^{-1}$ and $T_L^{-1}$.

In order for the asymmetric pulsed fields to produce the migration described, the major frequency component related to the high field portion of the pulse $T_H^{-1}$, should not exceed the rate, $\nu$, at which the Debye layer is formed. In addition, in order to obtain field penetration, the low frequency component, $T_L^{-1}$, must exceed the electrode layer build-up rate, $\nu^*$. Thus, $$\nu^* < T_L^{-1} < T_H^{-1} < \nu \quad (18)$$

There are preferred ranges of values for the dispersed phase (contaminant) particle size and ion density of the liquid, in order to achieve effective separation of the dispersed phase by the process described herein. Specifically, the radius of the particle, $R_p$, should not greatly exceed the Debye length since the high field mobility, $\mu_H$, given approximately by $$\mu_H \approx \frac{Q}{6\pi\eta R_p} \left(1 - \frac{R_p}{R_p + \lambda_D}\right) \quad (19)$$

becomes vanishingly small for $R_p >> \lambda_D$.

The fraction, $\delta$, defined as the difference in the high and low field mobilities divided by the unshielded particle mobility, $\mu_o$, is $$\delta = \frac{\mu_H - \mu_L}{\mu_o} \quad (20)$$

where $$\mu_o = \frac{Q}{6\pi\eta R_p}.$$

The parameters of the system would preferably be chosen to maximise $\delta$; that is, to cause $\delta \approx 1$. Substituting equations (19) and (10) into equation (20) yields $$\delta = \left(\frac{1}{n\lambda_D^3}\right)\left(\frac{Q}{e}\right)\left(\frac{\mu_L}{\mu_{ion}}\right) \quad (21)$$

where $\mu$ in equation (10) becomes $\mu_L$. The maximum value of Q possible is $$Q_{max} = 12\pi\epsilon R_p^2 E_c$$

and may be acquired by the particle by contact charging at an electrode, for example. Using equation (17)

$$Q_{max} = 12\pi R_p^2 \rho \left(\frac{\mu_{ion}}{\mu}\right)\lambda_D \quad (22)$$

Substituting the value of $Q_{max}$ into equation (21) yields $$\delta = \left(\frac{1}{n\lambda_D^3}\right)\left(\frac{12\pi R_p^2 \rho \lambda_D}{e}\right)$$

$$= \frac{12\pi R_p^2}{\lambda_D^2}$$

For $\delta \approx 1$ $$R_p \approx \frac{\lambda_D}{6} \quad (23)$$

It can be seen from equations (19) and 23) that the preferred parameter range for particle size and ion density is given by $$\lambda_D/6 \lesssim R_p \lesssim \lambda_D \quad (24)$$

It is to be emphasized that the above inequalities represent a preferred range. The inventors have observed non-spherical clusters of spheres, where at least one dimension was greatly in excess of $\lambda_D$, execute the unidirectional migration described herein.

The relationship with the liquid properties is established through $\lambda_D$; $\lambda_D = 0.5 \, (\epsilon_R/\rho)^{\frac{1}{2}} 10^{-6}$ m where $\epsilon_R$ is the relative dielectric constant of the liquid. For example, for deionized water $\epsilon_R = 80$, $\rho = 10$ coul.m$^{-3}$) and for tar from a catalytic cracker $\epsilon_R \approx 2$, $\rho \approx 0.25$ coul.m$^{-3}$) the optimum particle size range for the described separation process is $$0.2\mu \lesssim R_p < 1.5\mu$$

This optimization is with respect to the non-linearity of the electrophoretic migration mechanism. It remains, however, that the force on small particles, though optimized, may still be very small.

The foregoing description has explained that, for the electrical separation process disclosed herein to be effective, it is necessary that the mobility of the dispersed phase be field-dependent. One way in which this can occur is for the locally experienced electric field to exceed a critical value $E_c$, given by equation (17) above. Another way of achieving field-dependent mobility is where the continuous liquid phase is one in which the intrinsic ionic species, which comprise the continuous liquid phase and render it conductive, exhibit different mobilities.

Disparity in the ionic mobilities is to be expected to occur naturally in liquids. In the rare event either that the mobilities of the naturally-occurring positive and negative ions are equal or, at the other extreme, that the mobility of an ion of one polarity- is considerably larger than that of the ion of opposite sign, in both cases for which there will be no net unidirectional motion of dispersed phase contaminants induced by pulsed, asymmetric locally-acting electric fields as will be discussed further in the description below, an ionic-dissociating species may be seeded into the liquid at extremely low levels; that is at levels which correspond to a concentration of dissociated ionic species of the order of one part per billion, the positive and negative components of which would exhibit the desired disparity in their mobilities.

A field-dependent mobility of the dispersed contaminant phase is produced if the naturally-occurring or seeded ions comprising the continuous liquid phase have disparate-mobilities and if a pulsed, asymmetric electric field is produced acting locally on the dispersed contaminant phase species, for reasons which will now be described. The positive and negative ions migrate through the liquid in response to the local electric field with different velocities depending upon their mobility and the magnitude of the local electric field which they experience. These migrating ions, if they should encounter a dispersed phase species, will charge that species to a level which depends upon the ion mobility, mobility difference between the positive and negative ions, electric field magnitude and waveform, and other parameters. A field-dependent mobility for the dispersed phase species thereby arises since the mobility of the dispersed phase species is proportional to the charge it acquires and as indicated above, the charge is field-dependent.

The largest electrophoretic force resulting from a field-dependent mobility of the dispersed contaminant phase produced by disparate ionic mobilities might be expected to occur when the disparity in the ionic mobilities is largest. However, this is not the case because considering the extreme case where one of the ionic species is completely immobile (so as to maximise the disparity in the ionic mobilities), then the other ionic species will charge the dispersed phase to a maximum value. When the field direction is reversed no discharging by the other ionic species will occur since it is immobile. The dispersed phase charge, then, approaches a constant In the presence of sinusoidal fields, or a superposition thereof to produce a pulsed, asymmetric field waveform, there can only be sinusoidal motion of the dispersed phase and no net unidirectional motion.

While desired net migration cannot occur either in the limit that the ionic mobility disparity approaches zero, or in the limit that it approaches the value of the mobility of one of the ionic species (i.e. the mobility of the other species is substantially zero), net migration of the dispersed contaminant phase may be produced for a range of values of the ionic mobility disparity which is intermediate to these extremes. In the case that the ratio of the difference in the mobilities of the positive and negative ionic species to the greater valued mobility of the two species is very much less than unity, and in the case where an electric field having a pulsed, asymmetric waveform of period T as described above is made to act locally on the dispersed phase, the charge, $Q_H$, induced during the portion of the field having magnitude $E_H$ and the charge, $Q_L$, induced on the contaminant phase during the portion of the pulse where the field is reversed in sign and has magnitude $E_L$ are given by:

$$Q_H = 3\pi R_p^2 \rho_o \Delta\mu E_H \left[ 1 + \left( \frac{\tau_H - \tau_L}{\tau_L} \right) e^{-\nu\tau_H} - \frac{\tau_H}{\tau_L} e^{-\nu\tau} \right] / \nu(1 - e^{-\nu\tau})$$

and $$Q_L = 3\pi R_p^2 \rho_o \Delta\mu E_L \left[ 1 - \left( \frac{\tau_H - \tau_L}{\tau_H} \right) e^{-\nu\tau_L} - \frac{\tau_L}{\tau_H} e^{-\nu\tau} \right] / \nu(1 - e^{-\nu\tau})$$

where
$R_p$ = radius of dispersed phase contaminant
$\rho_o$ = charge density of ionic species
$\Delta\mu = \mu_+ - \mu_-$; difference in mobilities of positive and negative ionic species, and
$E_H$, $E_L$, $\tau_L$, $\tau_H$, $\tau$ = the parameters, defined above, of the pulsed, asymmetric electric field waveform.

It can be shown that the maximum force may be produced (for the case where the mobility of the positive species, $\mu_+$, exceeds that of the negative species, $\mu_-$) if the ratio $\mu_-/\mu_+$ is less than but nearly equal to 1 and the characteristic frequencies as determined from the liquid and pulsed, asymmetric electric field waveform parameters satisfy the requirements:

$$\nu^* < \tau_L^{-1} < \nu_- < \tau_H^{-1} < \nu_+ < \nu$$

where
$\nu^*$, $\tau_L$, $\tau_H$, and $\nu$ have been defined; and,
$\nu_- = \rho_o \mu_-/\epsilon$
$\nu_+ = \rho_o \mu_+/\epsilon$
Under these conditions, the maximum force, $F_s$, is given by $$F_s \simeq 4\pi R_p^2 E_H^2 \left[ \frac{1 - \left(\frac{\mu_-}{\mu_+}\right)^{\frac{1}{2}}}{1 + \left(\frac{\mu_-}{\mu_+}\right)^{\frac{1}{2}}} \right] \tag{25}$$

The inventors have ascertained that $T_H/T_L \approx 1/3$ is near optimum for producing the largest possible electrophoretic separating force. Furthermore, equation (25) above demonstrates that when the ionic mobilities are equal, there is no net electrophoretic migration of the dispersed phase. The electrophoretic force given by the expression above is large indeed for even slightly disparate ionic mobilities. For $\mu_+ = 2\mu_-$, for example, the force is only a factor of about 20 less than the theoretical maximum electrical force that can be produced due to a constant electric field.

EXAMPLES

The separation process described herein has been reduced to practice for the case of latex spheres as model contaminants which were dispersed in several hydrocarbon liquids. Latex spheres from Dow Diagnostics Inc. with radius $R_p = 3$ μm were filtered from the aqueous system in which they were supplied, washed with isopropyl alcohol, dried in a vacuum oven, and redispersed in the various hydrocarbon liquids. The liquids used were Isopar K, Marcol 52, and iso-octane. Their room temperature viscosities were $2 \times 10^{-3}$, $9.5 \times 10^{-3}$ and $5 \times 10^{-4}$, kg.m$^{-1}$s$^{-1}$ (2, 9.5, and 0.5 cp), respectively.

Figure 6:
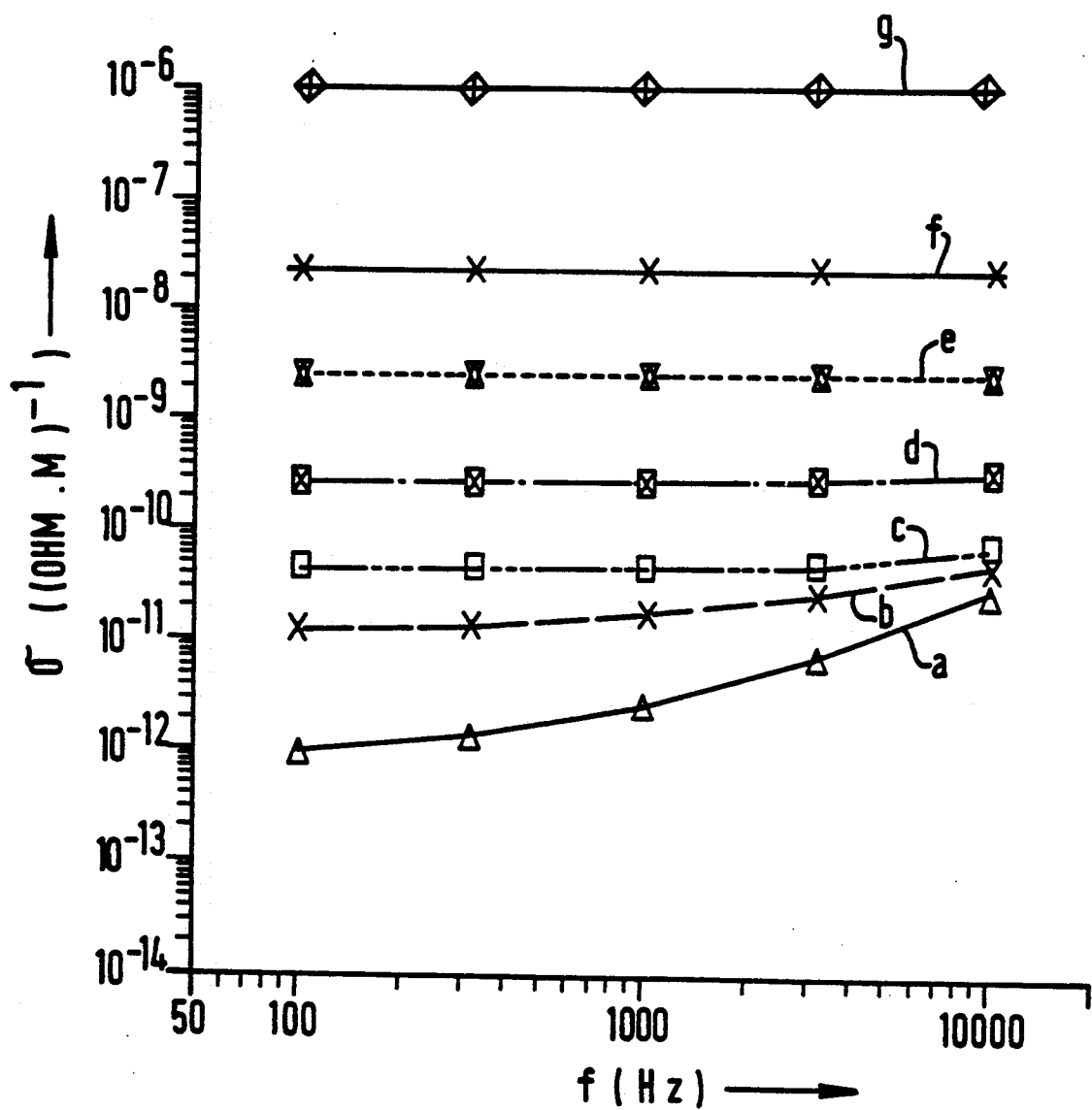
FIG. 6 presents experimental data showing how the conductivities of a particular pure hydrocarbon liquid and of that liquid with different concentrations of additive to alter the liquid's conductivity are relatively insensitive to measurement frequency.

The conductivity of the liquids was varied by the addition of sodium dodecyl sulphosuccinate, Aerosol OT. The room temperature conductivity, $\sigma$, of Isopar K as a function of frequency, $\omega$, is shown in FIG. 6 for pure Isopar K (plot (a)) and for several values of the Aerosol OT concentration in Isopar K (plots (b) to (g)). Plots (b) to (g) respectively represent experimental data for Aerosol OT concentrations of 0.01, 0.1, 1, 10, 100, and 1000 mM in Isopar K. The data plots show that the conductivity of the liquid/Aerosol OT mixture is largely insensitive to measurement frequency over the range of frequencies and levels of conductivities of interest. Thus, we can use the measurement at one frequency, say 1 KHz, in the range of frequencies studied to determine the DC conductivity. The conductivity of Isopar K and Marcol 52 as a function of Aerosol OT concentration at a frequency of 1 KHz is shown in curves a and b in FIG. 7. The conductivity ratio of the two liquids is roughly the inverse of their viscosity ratio. This implies that the degree of dissociation of the Aerosol OT and hence the ion density in both liquids is the same since $\eta\sigma \sim p/R_{ion}$, where $\eta$ and $\sigma$ are the viscosity and the conductivity, respectively, and $R_{ion}$ is the ionic radius.

Figure 7:
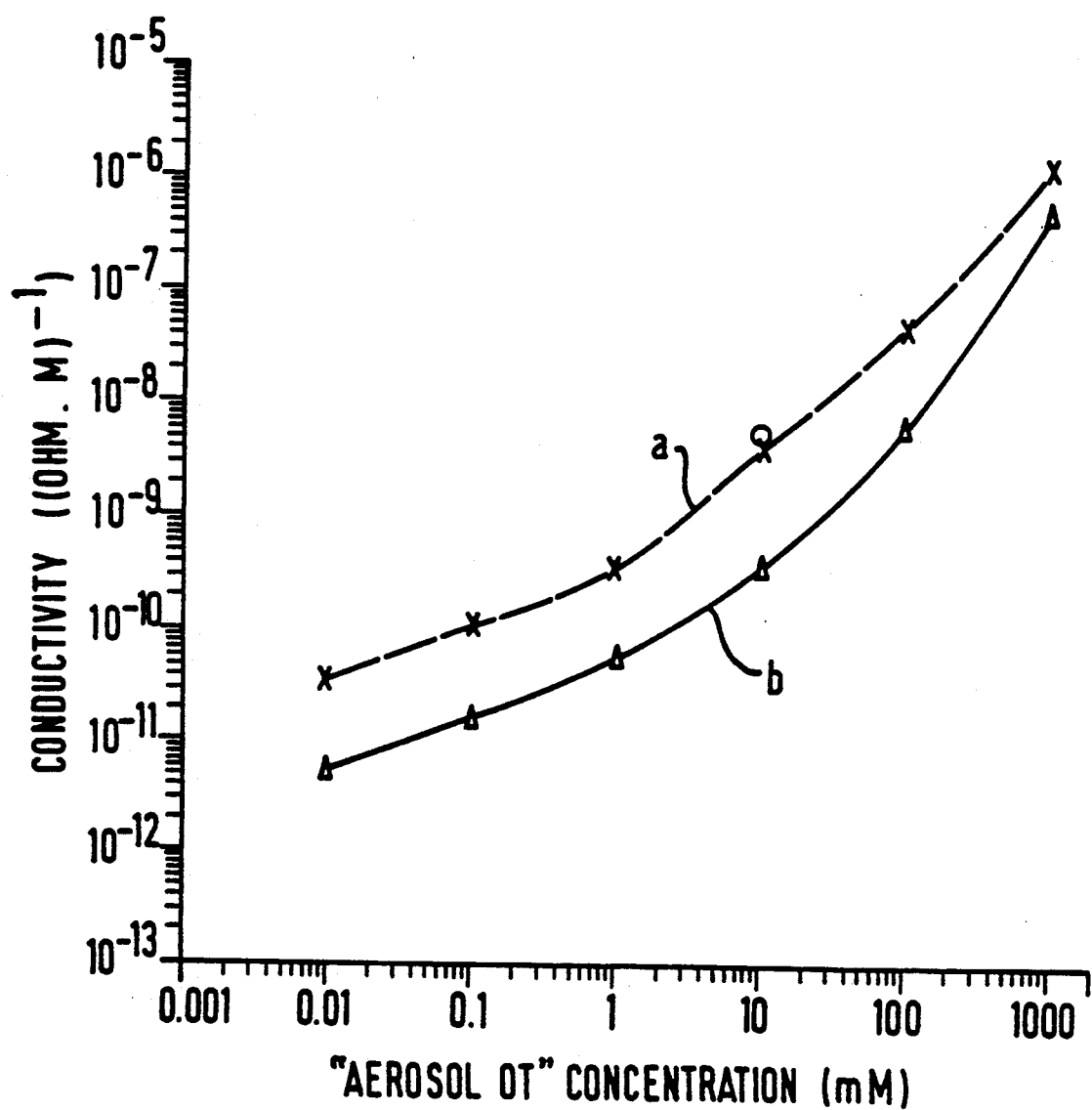
FIG. 7 is a plot of the conductivity data for different hydrocarbon liquids as a function of additive concentration at one particular measurement frequency.

The conductivity of octane at a single concentration of Aerosol OT (indicated by the circle-denoted data point) is also shown in FIG. 7. The conductivity of the octane/Aerosol OT and Isopar K/Aerosol OT are approximately equal although their viscosities differ by a factor of four. Thus, the ion density in the octane system may be higher. Alternatively, the ion radius may be smaller. The latter explanation is plausible since the Aerosol OT ions are likely to be micelles rather than single molecular ions and the number of molecules comprising the micelle may vary between liquids.

One form of separation apparatus in accordance with the invention and in which experiments have been carried out to demonstrate the practical operability of the invention will now be described with reference to the FIGS. 8 and 9, FIG. 8 being a cut-away perspective view of a separation cell 20 and FIG. 9 indicating an optical system associated with the separation cell for observing dispersed particle motion in a continuous liquid phase. The cell 20 is in the form of an open-topped container having a glass bottom 21 and glass side walls 31. Two opposite side walls 31 bear copper foil plate electrodes 32 on their inner faces provided with electrical contact members 35 which project through the side walls 31 to the exterior of the cell for the application of desired voltage waveforms from an external voltage generator source (not shown). Liquid to be treated containing dispersed particles is introduced into the cell through its open top.

Experiments were carried out in a cell of the aforesaid construction containing parallel-arranged electrodes 32 separated by a 1 mm gap. The area of each electrode was 8 cm$^2$. The electrodes were coated with a thin insulating film 33 of polyethylene terephthalate, commercially available under the Trade Name "Mylar", giving a charge build-up rate $\nu^* = 5 \times 10^{-4}\nu$, where $\nu = \sigma/\epsilon$, of the liquid.

With reference to FIG. 9, liquid containing dispersed particles was added to the cell and the motion of the particles between the electrodes was observed with a 300x microscope 37 and recorded by a video camera/recorder system comprising a video camera 38, video recorder 39 and video monitor 40. The cell 20 was illuminated either from the rear of the cell by means of a bright-field illuminator 34 thereby backlighting the particles and forming a bright field image where the particles obscured the light and appeared as dark images, or through the side or top of the cell by an He-Ne laser (dark field illuminator) 36 resulting in a dark field, where the particles scattered the light into the microscope and appeared as bright images.

No particle migration nor liquid motion of any kind was observed when DC fields were applied to the insulated electrodes. Sinusoidal fields at higher frequencies were observed to cause symmetric oscillatory motion of the contaminants for liquids having a conductivity up to $\sigma = 10^{-8}/(\Omega.m)^{-1}$, but net unidirectional migration did not occur. Field strengths up to $2 \times 10^6$ V.m$^{-1}$ were applied. These results show that the electric fields were indeed penetrating within the liquid bulk. Furthermore, from FIG. 3, the particle mobility was field-dependent yet there was no asymmetry present in the system to cause unidirectional migration.

However, unidirectional electrophoretic motion was observed when assymmetric wave forms of the type described earlier were employed. Typically, the waveforms had $$\frac{T_H}{T_L} \leq \frac{1}{4}$$

and $E_H$ was varied to $2 \times 10^{-6}$ V.m$^{-1}$.

The case in which the liquid was Isopar K and the Aerosol OT concentration was such as to produce a conductivity of about $2 \times 10^{-10}(\Omega.m)^{-1}$ will be described in detail. This combination of liquid mixture and particle size was representative of a system which produced nearly ideal net unidirectional electrophoretic motion in a cell having insulated plane-parallel electrodes.

First, variation of the asymmetric pulse frequency, $T^{-1}$, produced the following results. No unidirectional electrophoretic motion was observed for zero frequency (DC) as stated earlier. Some motion was observed at about 1 Hz and the net distance travelled per pulse was greatest for frequencies between 3–10 Hz. This distance slowly decreased with increasing frequency until no motion was observed for pulse repetition frequencies greater than about 2 KHz. These observations support the preferred frequency range described in the previous section leading up to equation (18).

Second, variation of the pulse widths $T_H$ and $T_L$ for a fixed frequency $T^{-1}$, ($T = T_H + T_L$) resulted in no unidirectional motion when $T_H = T_L$ and the largest amplitude unidirectional electrophoretic motion was $T_H/T_L$ was approximately ⅛ to ¼.

Third, the direction of the unidirectional electrophoretic migrational motion was reversed when the direction of the fields $E_H$ and $E_L$ was reversed. This shows that the motion is, in fact, electrophoretic in origin. For dielectrophoretic forces the direction of the motion is determined by the direction of the field gradient rather than by the polarity of the field. For pulse widths in the range where the optimum motion occurred, the amplitude of the motion increased with increasing $E_H$ in accordance with equation (14).

Fourth, variation of the particle size from nominally the 3,$\mu$m isolated spheres to non-spherical clusters of these spheres comprising up to 500–1000 spheres showed that the distance travelled per pulse was greatest for the isolated particles. For this liquid mixture, the thickness of the ion atmosphere, $\lambda_D$, is approximately equal to the radius of the latex sphere. This condition for the optimum observed unidirectional electrophoretic migration is consistent with the range expressed in equation (24).

Fifth, the particles which reach the liquid boundaries after having been acted upon by the asymmetric, pulsed electric fields exhibit a time-varying behaviour in their interaction with the electrodes and with each other at or near the electrode surface.

If the asymmetric, pulsed fields are produced when the density of particles at or near the collector electrode is initially low and uniform, then the particles which migrate to the collector electrode under the action of the applied voltage will tend to deposit uniformly on the collector electrode. That is to say, the particles form what appears to be a uniform coating or "sheet" on the collector electrode.

If the direction of the electric field is reversed, thereby making the opposite electrode the collector electrode, the particles will be caused to leave the previous collector electrode as a "sheet" which will traverse the cell to the opposite collector electrode with some broadening in the thickness (that is the spatial extent of the sheet in the direction which is parallel to the electric field) as the particles move towards the opposite electrode. This effect can be utilized for electrode regeneration purposes.

If the particle density initially is high or non-uniform either in the bulk of the liquid or at or near the elecrodes such as might be obtained by introducing particle-laden liquid in the cell containing a clear previously depar0ticulated liquid or by periodically reversing the field direction as described previously, then as the pulsed, asymmetric fields are applied the density, non-uniformity increases both in the bulk of the liquid as well as at the collector electrodes.

For example, clusters of particles form in the bulk of the liquid. Two processes contribute to the growth of these agglomerates. One process is due to the particle-particle dielectrophoretic forces which are produced by the gradients in electric field which exist near closely-spaced particles and are produced by the distortion of the uniform field due to the presence of one or more particles separated approximately by their diameters. The presence of the particles tends to alter the uniformity of the applied field and thereby produces gradients of the field near the particles. A second process is the impact agglomeration of two or more particles which move at different speeds due to variation in the particles mobility (due in turn to variation in charge or size or both).

The clusters which the inventors have observed to form in the liquid bulk under these conditions are usually non-symmetric. They are preferentially formed in one direction; that is, the direction of the electric field. Some growth, albeit considerably less, occurs in the transverse direction since the gravitational force on the agglomerated dispersed phase generally leads to buoyancy or settling. These processes increase as the size of the agglomerates increase. Thus, in the case of the latex spheres in the hydrocarbon liquids, as the agglomerates grow they begin to settle and sweep out smaller clusters and individual spheres which are also settling but at a much slower rate.

A second example of agglomeration which the inventors have observed is the formation of clusters of particles having the appearance of asperites which grow and protrude into the liquid from the electrode surface. These asperites "grow" from the electrode surface with their long axis parallel to the electric field. These asperites seem to produce and enhance field gradients which cause preferential deposition of further particles to occur at or near the tip of the protuberance in the liquid. In extreme cases, the inventors have observed the asperity to grow to such a size as to eventually bridge the cell. In this case, the agglormerate is comprised of more than several hundred individual particles.

The asperites will settle (or float depending upon the particle material mass density relative to that of the liquid) when they have grown large enough. They were observed to settle (in the case of the latex spheres) in such a way that they remained aligned along the field direction and with one end adjacent to an electrode.

While one end of the agglomerate is observed to be held at or adjacent to the electrode surface, the agglomerate may be caused to "detach" from the electrode surface and move into the bulk of the liquid if the field is suddenly increased. The agglomerate will then both settle and move to the opposite electrode.

In either the case of bulk liquid or electrode surface-formed agglomerate which have grown to a size such that settling (or floating) occurs, when the electric field is switched off the elongated agglomerates (whose long dimension was aligned parallel to the electric field direction) slowly rotate while settling. Eventually, the long axis of the agglomerates will be oriented vertically; that is, in the direction where the plane of the smallest cross-section of the agglomerates is normal to the settling direction.

The inventors have observed that a particular type of particle motion may be induced at and near the surface of the liquid in their experimental cell. This motion is produced by charges which are induced at the curved liquid surface meniscus by the component of the electric field which is normal to the air/liquid interface. These charges at the interface are driven by the component of the electric field which is tangential to the interface. The moving charges at the interface cause liquid to move due to viscous drag and the incompressibility of the liquid results in convection vortices to form at the liquid surface. This motion has been observed with and without insulating layers covering the electrodes. The rapidly rotating liquid causes circulatory motion of the dispersed phase and this convective motion in the liquid tends to reduce the electrophoretic motion produced by the pulsed asymmetric fields. This convective motion may, however, be eliminated by filling the cell sufficiently such that the level of liquid is above the top edge of the electrodes or by reducing the curvature of the meniscus. The latter may be achieved by providing a surface coating on the electrodes which alters the wetting angle of the liquid at the electrode, by increasing the spacing between electrodes by curving the electrodes outward, or by contacting the particle-laden liquid with a second liquid which removes the interfacial curvature.

From the foregoing description, it will be apparent that, for dispersed solid particles, these will collect and agglomerate on electrode surface areas or in the liquid bulk, possibly near to one of the electrodes. The particle agglomerates can be separated in any known way such as by mechanical filtering or discharging the substantially particle-free liquid from the cell, leaving the particle agglomerate behind. Where the dispersed phase is a liquid, the liquid droplets will agglomerate and grow until, for example, they separate out from the continuous liquid phase by settling or floatation, according to the relative densities of the two liquids. One or other of the liquids can then be removed by tapping off or skimming off in other ways known per se in the separation art. Similar techniques apply for dispersed gas bubbles which will usually rise to the surface, following bubble size growth, and dissipate into the atmosphere. Alternatively, the bubbly froth on the surface can be skimmed off or the substantially bubble-free liquid below can be tapped off.

It is further remarked that the description given above relates to a separation cell for batch treatment of liquids. However, it will of course be appreciated that the cell could be designed as a throughflow cell and with appropriate control of the throughflow rate and liquid level (in cases where the throughflow cell is not completely filled), the dispersed phase would be separated out from the continuous liquid phase in much the same way as described above for batch separation. Where the dispersed phase is in the form of liquid droplets which are electrically separated out to form a separate layer from the continuous liquid phase, liquid would be drawn off from a region of the body of continuous liquid phase where the liquid is substantially free of the dispersed phase, while equivalent fresh quantities of untreated liquid are introduced into the separation cell.

In another embodiment, one or both of the electrodes may be one or more liquids which have higher conductivity and are immiscible with the contaminated liquid which is to be clarified. In this arrangement the dispersed contaminant phase may be driven, by the electrophoretic treatment, into the liquid electrode. This has the further advantage of minimizing the amount of the original liquid entrained by the separated contaminant phase when it is drawn off from the separation cell.

It will be appreciated from the foregoing description that the principal envisaged application of the invention is to the separation or segregation of a dispersed phase from a continuous liquid phase. However, the invention does find application also to the concentration of a dispersed phase. With reference to the plan view of FIG. 10, this application of the invention may be realized for example by flowing the dispersed phase-laden liquid 60 within a main conduit 63 and between two parallel plate electrodes 61 which may be insulated and across which an asymmetric electric field is maintained by a voltage generator 62. The impurities migrate towards one electrode so that downstream from the electrodes, the main conduit 63 divides into branch conduits 63a, 63b, carrying for example the liquid streams of respectively higher and lower dispersed phase concentrations. The higher concentration stream can be discarded or recycled for example and if the other stream still does not have an adequately low dispersed phase concentration, it can be recycled to reduce the concentration further.

Figure 10:
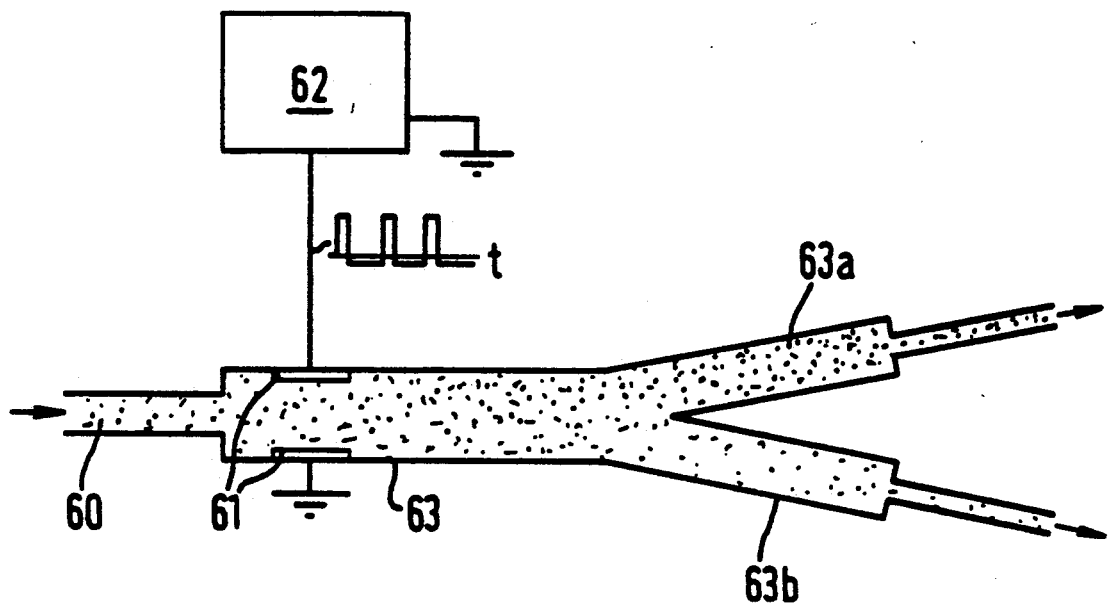
FIG. 10 is a diagrammatic plan view of another embodiment which electrophoretically treats a stream of dispersed phase-laden liquid to provide two streams, respectively of relatively high and relatively low dispersed phase concentration.

Another area of application is where the dispersed contaminant phase comprises wax crystals or other soft or gel-like substances. The separation of such dispersed-phase contaminants from the continuous liquid phase may be made by using an electrical separator, an example of which is shown very diagrammatically in FIG. 11. The separator comprises a cylindrical drum 40 which rotates, in the direction indicated, about a horizontal axis and is at ground potential and serves as a grounded electrode. Drum 40 may be fabricated from an insulated metallic grid or screen and covered with a filter cloth (not specifically shown). Wax-laden liquid is introduced, for example from a spray nozzle 41, onto the drum surface near the top and is conveyed by the rotating drum beneath a part-cylindrical electrode segment 42 which is concentric with drum 40 and to which an asymmetric, periodic, rectangular-pulse waveform voltage is applied from a voltage generator (not shown), as indicated in FIG. 10. A second part-cylindrical electrode segment 43 is positioned alongside, and at a small spacing from, the drum surface and at a location which is approximately diametrically opposed to electrode segment 42. To electrode segment 43 is applied a periodic pulsed voltage which is identical to the voltage waveform applied to electrode segment 42 but of opposite polarity. The electrode-drum separations 42–40 and 43–40 are such so as to produce a peak electric field of about $10^6$ V/m. The wax crystals, which are assumed to be positively-charged, are driven to the surface of the filter cloth by application, by the electrode segment 42 of the asymmetric pulsed fields as the grounded drum rotates. A wax deposit or cake forms on the filter cloth and may be removed within one or more rotations of the drum by conventional solvent washing (for example by spraying wash liquid onto the drum surface from spray nozzle 44), or mechanical scraping by scraper 45 positioned adjacent the drum surface, or driven off the filter cloth by application of the opposite polarity asymmetric pulsed field by electrode 43, and into a second wash liquid, sprayed onto the drum surface by nozzle 44, or by any combination of these measures. The clarified liquid separates from the drum under gravity as a stream 46. Similarly, the wax-containing solvent wash or wash liquid streams off the drum as indicated at 47.

Application areas other than those associated with the separation of a dispersed phase contaminant in order to clarify the continuous phase or to reclaim the dispersed phase are those associated with utilizing the electrophoresis-effected migration of the dispersed phase to create an inhomogeneous distribution of the dispersed phase in order to alter the optical, electrical or thermal properties of the fluid or the interface between the fluid and its confining container. For example, one limitation to electrophoretic display devices is the electrochemically-related deterioration of the electrodes. Using the asymmetric pulsed field method, the electrodes may be fabricated with a protective insulating layer which prevents the occurrence of electrochemical processes. Therefore, the limitation to the device lifetime by electrochemical electrode deterioration may be eliminated. However, since fields of this type will penetrate the bulk of the field, this method may be used to drive the dispersed scattering phase (for example, $TiO_2$ particles) toward the viewing surface at which the increased scattering of the ambient light occurs. By reversing the polarity of the pulsed field, the scatters may be driven away from the viewing direction and thereby permit substantial absorption of the incident ambient light by the continuous liquid phase.

In some instances, it may be the case that the continuous liquid phase does not exhibit sufficient ionic conductivity or a suitable disparity in the ionic mobilities for the positive and negative ions of the continuous liquid phase, in order that the electrophoretric migration process described above may occur. Similarly, for other applications, a specific continuous phase liquid or liquid mixture must be employed due to desirable properties, such as chemical inertness or viscosity, but that liquid or liquid mixture may not exhibit sufficient ionic conductivity or disparity in the bipolar ionic mobilities.

In both cases the desired level of ionic conductivity or disparity in ionic mobility may be achieved by intentionally added a component to the liquid or liquid mixture which dissolves and which thermally and/or chemically dissociates to a degree so as to impart adequate ionic conductivity to the original liquid or liquid mixture.

What is claimed is:

1. A method of effecting separation, by electrophoresis, of a dispersed phase in a continuous liquid phase under conditions of intrinsic ionic conductivity due to intrinsic bipolar ions in the continuous phase, said dispersed phase exhibiting a field-dependent mobility $\mu(E)$ when the dispersed phase-containing continuous phase is subjected in a treatment zone to an applied periodic voltage which produces an electrophoretic migration of the dispersed phase in the continuous liquid phase, which voltage causes both the continuous liquid phase and the dispersed phase to be subjected to an electric field, $E_{in}(t)$, within the continuous liquid phase, where t represents time, having a periodic waveform of period T, said mobility $\mu(E)$ being defined as the ratio, at any instant, of the dispersed phase electrophoretic migration velocity to the electric field $E_{in}(t)$, wherein the electric field $E_{in}(t)$ is defined by the equation, $E_{in}(t)=E_o+E(t)$, where $E_o$ is a constant electric field of one polarity which may be zero and E(t) is an electric field component having an asymmetric periodic waveform of alternate positive and negative features, where "asymmetric periodic waveform" is defined for E(t) by the conditions $$\int_{t_o}^{t_o+T} E(t)dt = 0 \text{ and } \frac{1}{T_H} \cdot \int_{t_o}^{t_o+T_H} E(t)dt \neq \frac{1}{T_L} \cdot$$

$$\int_{t_o+T_H}^{t_o+T} E(t)dt,$$

where $t_o$ is the time at which any arbitrary feature of one polarity commences and $T_H$ and $T_L$ are the time durations of the positive and negative features, respectively, where $T_H+T_L=T$, said electric field component interacting with said bipolar ions to produce said field-dependent mobility for effecting said migration, said migration directly causing an asymmetry in the population of the dispersed phase in the continuous liquid phase, said method further comprising effecting a relative separation as between on the one hand at least dispersed phase in a region of said continuous liquid phase having a relatively high dispersed phase amount due to said population asymmetry and on the other hand continuous liquid phase in a region of relatively low dispersed phase amount.

2. A method as claimed in claim 1, wherein the conductivity of the continuous phase is greater than about $10^{12}$ $(\Omega.m)^{-1}$.

3. A method as claimed in claim 1, wherein the conductivity of the continuous phase is greater than about $10^{-10}$ $(\Omega.m)^{-1}$.

4. A method as claimed in claim 1, wherein the conductivity of the continuous phase is greater than about $10^{-8}$ $(\Omega.m)^{-1}$.

5. A method as claimed in claim 1, wherein the conductivity of the continuous phase lies in the range about $10^{-12}$ to $10^{-5}$ $(\Omega.m)^{-1}$.

6. A method as claimed in claim 1, wherein the conductivity of the continuous phase lies in the range about $10^{-10}$ to $10^{-6}$ $(\Omega.m)^{-1}$.

7. A method as claimed in claim 1, wherein the applied voltage is an asymmetric waveform of rectangular pulses.

8. A method as claimed in claim 7, wherein the ratio of the duration of each pulse of larger magnitude to that of each pulse of smaller magnitude is from about ¼ to about ⅓.

9. A method as claimed in claim 1 for the continuous separation of dispersed phase from the continuous phase, wherein a stream of the dispersed phase-containing continuous phase is firstly subjected to the electric field, $E_{in}(t)$, so as to effect migration of dispersed phase to one side of the stream leaving continuous liquid phase with a lower amount of dispersed phase toward the other side of the stream, and the stream is then divided so as to provide two branch streams containing relatively high and relatively low amounts of dispersed phase respectively.

10. A method as claimed in claim 1, wherein the continuous liquid phase is a hydrocarbon oil mixture boiling in the lubricating oil range and the dispersed phase comprises a dispersion of wax particles.

11. A method as claimed in claim 11, wherein the wax-containing oil mixture is introduced onto a filter medium, extending around the curved outer surface of a drum rotating about a horizontal axis, and the asymmetric electric field $E_{in}(t)$ acts on wax particles in the oil mixture introduced onto the filter medium, such that wax migrates to and collects on the filter medium as a wax cake leaving substantially wax-free oil which streams off the drum.

12. A method as claimed in claim 1, wherein said treatment zone is defined at two sides by a pair of parallel electrodes each having an insulating layer on the faces thereof in contact with the continuous liquid phase, and wherein the frequency of the applied electric field is less than a quantity $\nu$ (herein referred to as "charge relaxation rate") but greater than a quantity $\nu^*$ (herein referred to as the "critical build up rate"), wherein:

$\nu = \sigma/\epsilon$, and $\nu^* = 2a\nu/L$, where
$\sigma$ is the conductivity of the continuous liquid phase;
$\epsilon$ is the dielectric content of the continuous liquid phase;
a is thickness of each insulating layer; and
L is the separation between the electrodes.

13. Apparatus for effecting separation, by electrophoresis, of a dispersed phase in a continuous liquid phase under conditions of intrinsic ionic conductivity due to intrinsic bipolar ions in the continuous liquid phase, said dispersed phase exhibiting a field-dependent mobility $\mu(E)$ when the treatment zone to an applied periodic voltage which produces electrophoretic migration of the dispersed phase within the continuous liquid phase, said voltage having a waveform of period T, said mobility $\mu(E)$ being defined as the ratio, at any instant, of the dispersed phase electrophoretic migration velocity to the electric field $E_{in}(t)$ acting on the dispersed phase, said apparatus comprising:

(i) means for handling a quantity of dispersed phase-containing liquid;

(ii) means for applying a voltage to the dispersed phase-containing liquid phase such that both the continuous liquid phase and the dispersed phase experience an electric field $E_{in}(t)$ which is defined by the equation $E_{in}(t) = E(t)$, where $E_o$ is a constant electric field of one polarity which may be zero and $E(t)$ is an electric field component having an asymmetric periodic waveform of alternate positive and negative features where "asymmetric periodic waveform" is defined by the conditions $$\int_{t_o}^{t_o + T} E(t)dt = 0 \text{ and } \frac{1}{T_H} \cdot \int_{t_o}^{t_o + T_H} E(t)dt \neq \frac{1}{T_L} \cdot$$

$$\int_{t_o + T_H}^{t_o + T} E(t)dt,$$

where $t_o$ is the time at which any arbitrary feature of one polarity commences and $T_H$ and $T_L$ are the time durations of the positive and negative features, respectively, where $T_H + T_L = T$, said electric field component $E(t)$ interacting with said bipolar ions to produce said field-dependent mobility $\mu(E)$ so as to produce said electrophoretic migration, said migration directly causing an asymmetry in the population of the dispersed phase in the continuous liquid phase; and (iii) means for effecting a relative separation as between on the one hand at least dispersed phase in a region within said continuous liquid phase handling means containing a relatively high amount of dispersed phase due to said population asymmetry and on the other hand continuous liquid phase in a region within said continuous liquid phase handling means containing a relatively low amount of dispersed phase.

14. Apparatus as claimed in claim 13 for the continuous separation of dispersed phase from the continuous liquid phase, wherein said means for handling a quantity of dispersed phase-containing liquid comprises a main conduit for conveying a stream of the dispersed phase-containing liquid phase, said main conduit including said treatment zone having said electrodes on opposite sides thereof, said main conduit being divided into two branch conduits downstream of said treatment zone and serving as said separation effecting means, for respectively conveying liquid phase containing relatively higher and relatively lower amounts of dispersed phase.

15. Apparatus as claimed in claim 13 for separating a dispersion of wax particles from a hydrocarbon oil mixture boiling in the lubricating oil range, wherein the separation effecting means comprises a rotary drum, arranged with its axis of rotation horizontal and having a filter medium extending around the drum circumference, and means operable for rotating the drum, and wherein means are provided for introducing waxy oil to be treated onto the drum surface, the voltage applying means being arranged to apply said voltage to the waxy oil on the drum surface, whereby wax forms a filter cake on the filter medium leaving substantially wax-free oil which streams off the drum.

16. Apparatus as claimed in claim 13, wherein the voltage applying means comprises a pair of mutually-separated electrodes defining said treatment zone between them, each electrode comprising an electrically-conductive plane surface covered with an insulating layer which prevents contact between the dispersed phase-containing liquid phase and the underlying electrically-conductive plane surface.

* * * * *